United States Patent
Cao et al.

(10) Patent No.: US 11,558,226 B2
(45) Date of Patent: *Jan. 17, 2023

(54) METHODS AND APPARATUS FOR GENERATION OF PHYSICAL LAYER PROTOCOL DATA UNITS FOR VEHICULAR ENVIRONMENTS

(71) Applicant: Marvell Asia Pte, Ltd., Singapore (SG)

(72) Inventors: Rui Cao, Sunnyvale, CA (US);
Hongyuan Zhang, Fremont, CA (US);
Hui-Ling Lou, Sunnyvale, CA (US);
Xiayu Zheng, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 27 days.

This patent is subject to a terminal disclaimer.

(21) Appl. No.: 17/334,638

(22) Filed: May 28, 2021

(65) Prior Publication Data

US 2021/0288858 A1     Sep. 16, 2021

Related U.S. Application Data

(63) Continuation of application No. 16/179,320, filed on Nov. 2, 2018, now Pat. No. 11,032,118.
(Continued)

(51) Int. Cl.
*H04L 5/00* (2006.01)
*H04L 27/26* (2006.01)
*H04W 84/12* (2009.01)

(52) U.S. Cl.
CPC ........ *H04L 27/2602* (2013.01); *H04L 5/0092* (2013.01); *H04L 5/0094* (2013.01);
(Continued)

(58) Field of Classification Search
CPC ... H04L 5/0023; H04L 5/0055; H04L 5/0044; H04W 72/005; H04W 4/12
See application file for complete search history.

(56) References Cited

U.S. PATENT DOCUMENTS 6,115,354 A      9/2000  Weck
6,721,294 B1     4/2004  Bahrenburg et al.
(Continued)

FOREIGN PATENT DOCUMENTS

EP     1643669 A1     4/2006
EP     3474482 A1     4/2019
(Continued)

OTHER PUBLICATIONS

Extended European Search Report for European Application No. 21216756.3, dated Apr. 12, 2022.
(Continued)

*Primary Examiner* — Abdelillah Elmejjarmi

(57) ABSTRACT

A communication device selects a frequency bandwidth via which a physical layer (PHY) protocol data unit (PPDU) will be transmitted in a vehicular communication network, and generates, the PPDU i) according to a downclocking ratio of 1/2, and ii) based on an orthogonal frequency division multiplexing (OFDM) numerology defined by an IEEE 802.11ac Standard. In response to the selected frequency bandwidth being 10 MHz, the PPDU is generated according to the downclocking ratio of 1/2 and based on the OFDM numerology defined by the IEEE 802.11ac Standard for 20 MHz PPDUs. In response to the selected frequency bandwidth being 20 MHz, the PPDU is generated according to the downclocking ratio of 1/2 and based on the OFDM numerology defined by the IEEE 802.11ac Standard for 40 MHz PPDUs.

22 Claims, 10 Drawing Sheets

Related U.S. Application Data

(60) Provisional application No. 62/595,452, filed on Dec. 6, 2017.

(52) U.S. Cl.
CPC ...... *H04L 27/2627* (2013.01); *H04L 27/2603* (2021.01); *H04L 27/26025* (2021.01); *H04W 84/12* (2013.01)

(56) References Cited

U.S. PATENT DOCUMENTS

| | | | |
|---|---|---|---|
| 8,867,653 | B2 | 10/2014 | Zhang et al. |
| 8,942,311 | B2 | 1/2015 | Zhang et al. |
| 9,119,186 | B2 | 8/2015 | Zhang et al. |
| 9,246,738 | B2 | 1/2016 | Zhang et al. |
| 11,032,118 | B2 | 6/2021 | Cao et al. |
| 2012/0236971 | A1 | 9/2012 | Taghavi Nasrabadi et al. |
| 2012/0289274 | A1 | 11/2012 | Matsuo et al. |
| 2012/0327871 | A1 | 12/2012 | Ghosh et al. |
| 2013/0077463 | A1 | 3/2013 | Zhang |
| 2013/0128807 | A1 | 5/2013 | Vermani et al. |
| 2013/0286961 | A1 | 10/2013 | Vermani et al. |
| 2015/0256304 | A1 | 9/2015 | Porat |
| 2016/0013908 | A1 | 1/2016 | Porat |
| 2016/0112547 | A1 | 4/2016 | Porat |
| 2016/0119452 | A1 | 4/2016 | Lee |
| 2016/0205677 | A1 | 7/2016 | Kim et al. |
| 2016/0366699 | A1 | 12/2016 | Zhang et al. |
| 2018/0233996 | A1 | 8/2018 | Zhu et al. |
| 2018/0359066 | A1 | 12/2018 | Mu et al. |
| 2020/0037385 | A1 | 1/2020 | Park et al. |

FOREIGN PATENT DOCUMENTS

| | | |
|---|---|---|
| JP | 2014515570 A | 6/2014 |
| WO | 2016067505 A1 | 5/2016 |

OTHER PUBLICATIONS

EEE P802.11ax/D2.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," Section 28, High Efficiency (HE) PHY specification, IEEE Computer Society, pp. 1-266 (Oct. 2017).

Jones et al., "TGaf Comments for PHY," Doc. No. IEEE802.11-11/0444r0, Qualcomm, Inc., 7 pages (Jan. 2011).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Standard 802.11p, "IEEE Standard for Information technology—Local and metropolitan area networks—Specific requirements—Part 11: Wireless LAN Medicum Access Control (MAC) and Physical Layer (PHY) Specifications Amendment 6: Wireless Access in Vehicular Environments," pp. 1-51, Jun. 2010.

IEEE Std 802.11-REVmc™/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std P802.11-REVmc™/D8.0, (Revision of IEEE Std 802.11TM-2012), "Draft Standard for Information Technology—Telecommunications and information exchange between systems—Local and metropolitan area networks—Specific requirements," Part 11: Wireless LAN Medium Access Control (MAC) and Physical Layer (PHY) Specifications, The Institute of Electrical and Electronics Engineers, Inc., 3774 pages (Aug. 2016).

IEEE Std. 802.1ax™, "IEEE Standard for Local and metropolitan ares networks—Link Aggregation," pp. 1-163, Nov. 3, 2008.

International Search Report and Written Opinion in Intenrational Patent Application No. PCT/US2018/058916, dated Feb. 27, 2019 (11 pages).

Porat et al., "Travelling Pilots," doc.: IEEE 802.11-12/1322r0, pp. 1-16, Nov. 12, 2012.

Ritt, "On pilot patterns in MIMO OFDMA transmissions in E-UTRA," 3GPP TSG RAN WG 1#42, R1-050786, London, UK, patens 1-6, Aug. 29-Sep. 2, 2005.

U.S. Appl. No. 62/517,724, Timofeev et al., "MIMO-OFDM Midamble with Compressed HE-LTF," filed Jun. 9, 2017.

Zhang et al., "802.11 for Next Generation V2X Communication," IEEE draft 802.11-18/0513r2, 29 pages (Mar. 6, 2018).

Notice of Reasons for Rejection for Japanese Application No. 2020-550588, dated Jul. 5, 2022.

Takashi et al., "M2M Wireless Access Network Consisting of Enormous Number of Terminals," Journal of Institute of Electronics, Information and Communication Engineers, vol. 96, No. 5, May 1, 2013 p. 330-335 (7 pages).

FIG. 8

| Channel Bandwidth 1 (MHz) ←804 | Subcarrier Frequency Spacing 1 (kHz) ←808 | Downclocking Ratio ←812 | Channel Bandwidth 2 (MHz) ←816 | Subcarrier Frequency Spacing 2 (kHz) ←820 |
|---|---|---|---|---|
| 40 | 312.5 | 1/2 | 20 | 156.25 |
| 80 | 312.5 | 1/4 | 20 | 78.125 |
| 20 | 78.125 | 1/2 | 10 | 39.0625 |
| 20 | 312.5 | 1/2 | 10 | 156.25 |
| 40 | 312.5 | 1/4 | 10 | 78.125 |
| 20 | 78.125 | 1/4 | 5 | 19.53125 |
| 20 | 312.5 | 1/4 | 5 | 78.125 |

←800

METHODS AND APPARATUS FOR GENERATION OF PHYSICAL LAYER PROTOCOL DATA UNITS FOR VEHICULAR ENVIRONMENTS

CROSS-REFERENCES TO RELATED APPLICATIONS

This application is a continuation of U.S. patent application Ser. No. 16/179,320, now U.S. Pat. No. 11,032,118, entitled "Methods and Apparatus for Generation of Physical Layer Protocol Data Units for Vehicular Environments", filed on Nov. 2, 2018, which claims the benefit of U.S. Provisional Patent Application No. 62/595,452, entitled "Enhanced 802.11p PHY Design," filed on Dec. 6, 2017. Both of the applications referenced above are incorporated by reference herein in their entireties.

FIELD OF THE DISCLOSURE

The present disclosure relates generally to communication networks and, more particularly, to physical layer protocol data units.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

The IEEE 802.11p Standard specifies protocols for wireless access in vehicular environments (WAVE). Future WAVE standards are aimed at delivering improved car-to-car or car-to-infrastructure connectivity, infotainment features, etc.

SUMMARY

In an embodiment, a method for wireless communication in a vehicular communication network includes: selecting, at a communication device, a frequency bandwidth via which a physical layer (PHY) protocol data unit (PPDU) will be transmitted in the vehicular communication network, wherein the frequency bandwidth is selected from a set of permissible frequency bandwidths that includes a 10 MHz bandwidth and a 20 MHz bandwidth; generating, at a communication device, the PPDU i) according to a downclocking ratio of 1/2, and ii) based on an orthogonal frequency division multiplexing (OFDM) numerology defined by an IEEE 802.11ac Standard, wherein the PPDU is generated to span the selected frequency bandwidth and to include a PHY preamble having a legacy preamble portion and a non-legacy preamble portion, and wherein: in response to the selected frequency bandwidth being 10 MHz, the PPDU is generated according to the downclocking ratio of 1/2 and based on the OFDM numerology defined by the IEEE 802.11ac Standard for 20 MHz PPDUs, and in response to the selected frequency bandwidth being 20 MHz, the PPDU is generated according to the downclocking ratio of 1/2 and based on the OFDM numerology defined by the IEEE 802.11ac Standard for 40 MHz PPDUs. The method further includes transmitting, by the communication device, the PPDU in the vehicular communication network.

In another embodiment, a wireless communication device comprises a wireless network interface device having one or more integrated circuit (IC) devices configured to: select a frequency bandwidth via which a PPDU will be transmitted in the vehicular communication network, wherein the frequency bandwidth is selected from a set of permissible frequency bandwidths that includes a 10 MHz bandwidth and a 20 MHz bandwidth; and generate the PPDU i) according to a downclocking ratio of 1/2, and ii) based on an OFDM numerology defined by an IEEE 802.11ac Standard, wherein the PPDU is generated to span the selected frequency bandwidth and to include a PHY preamble having a legacy preamble portion and a non-legacy preamble portion, and wherein: in response to the selected frequency bandwidth being 10 MHz, the PPDU is generated according to the downclocking ratio of 1/2 and based on the OFDM numerology defined by the IEEE 802.11ac Standard for 20 MHz PPDUs, and in response to the selected frequency bandwidth being 20 MHz, the PPDU is generated according to the downclocking ratio of 1/2 and based on the OFDM numerology defined by the IEEE 802.11ac Standard for 40 MHz PPDUs. The one or more IC devices are further configured to transmit the PPDU in the vehicular communication network.

BRIEF DESCRIPTION OF THE DRAWINGS

FIG. 8 is a table illustrating the effect of downclocking on bandwidth and subcarrier frequency spacing of a PHY protocol data unit, according to an embodiment.

DETAILED DESCRIPTION

Generation, transmission, and reception of physical layer (PHY) data units, as described below, are discussed in the context of wireless local area networks (WLANs) that utilize protocols similar to protocols defined by the 802.11 Standard from the Institute of Electrical and Electronics Engineers (IEEE) merely for explanatory purposes. In other embodiments, however, PHY data unit generation/transmission/reception techniques are utilized in other types of wireless communication systems such as personal area networks (PANs), mobile communication networks such as cellular networks, metropolitan area networks (MANs), satellite communication networks, etc.

Figure 1:
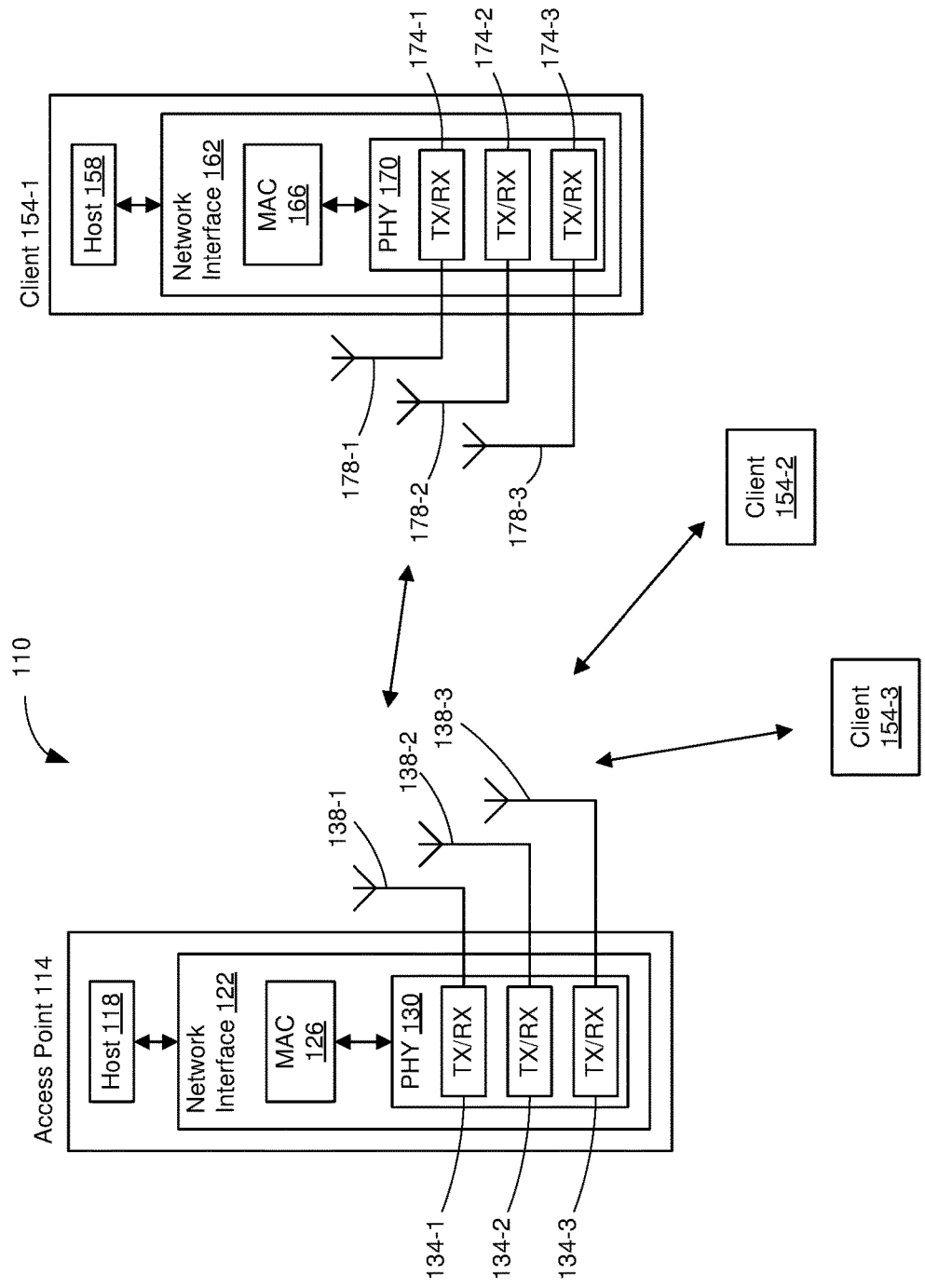
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface device 122 includes a medium access control (MAC) processor 126 and a PHY processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network interface device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard, a future version of the IEEE 802.11 Standard, or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PPDUs such as PHY protocol data units (PPDUs) for transmission via the antennas 138. Generating PHY protocol data units includes generating PHY preambles and PHY midambles of the PHY protocol data units, at least in some embodiments. Similarly, the PHY processor 130 may be configured to receive PPDUs that were received via the antennas 138, and extract MAC layer data units encapsulated within the PPDUs. The PHY processor 130 is configured to process PHY preambles and PHY midambles of the PHY protocol data units to perform functions such as one or more of synchronization, automatic gain control (AGC) adjustment, channel estimation, etc., at least in some embodiments. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network interface device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PPDUs such as PPDUs for transmission via the antennas 178. Generating PHY protocol data units includes generating PHY preambles and PHY midambles of the PHY protocol data units, at least in some embodiments. Similarly, the PHY processor 170 may be configured to receive PPDUs that were received via the antennas 178, and extract MAC layer data units encapsulated within the PPDUs. The PHY processor 170 is configured to process PHY preambles and PHY midambles of the PHY protocol data units to perform functions such as one or more of synchronization, AGC adjustment, channel estimation, etc., at least in some embodiments. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

In an embodiment, the WLAN 110 corresponds to a vehicular communication environment in which the AP 114 is located in a fixed location proximate to a roadway, and the client stations 154 are located in vehicles travelling on the roadway. In some embodiments corresponding to a vehicular communication environment, client stations 154 in different vehicles directly communicate with one another. In such environments, Doppler effects are more pronounced as compared to home or office WLAN environments. Additionally, longer range communications may be required in such environments as compared to home or office environments. Described below are example PPDU generation/transmission/reception techniques that are useful for environments that require longer ranges and/or in which Doppler effects are more pronounced, as compared to typical existing home or office WLANs environments.

Figure 2:
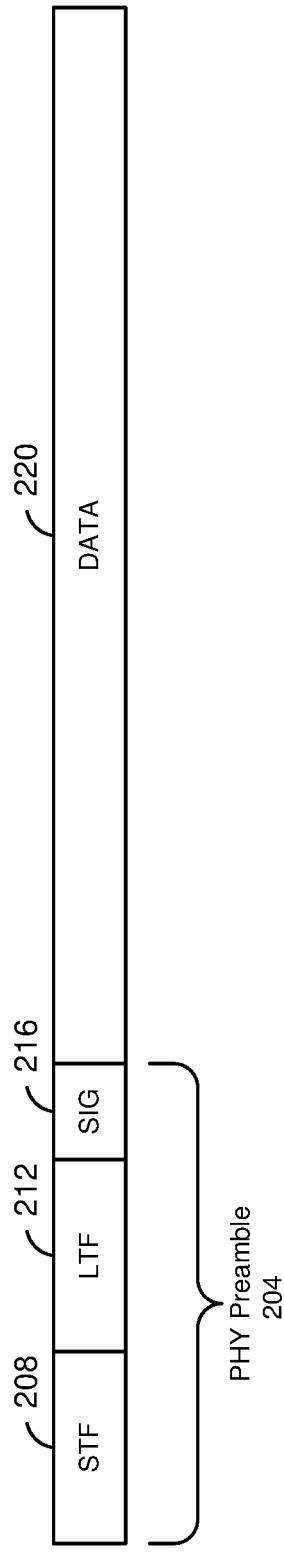
FIG. 2 is a diagram of an example physical layer (PHY) protocol data unit, according an embodiment.

FIG. 2 is a diagram of an example PPDU 200 that the network interface device 122 (FIG. 1) is configured to generate and transmit to one or more client stations 154, according to an embodiment. The network interface device 162 (FIG. 1) may also be configured to generate/transmit PPDUs the same as or similar to the PPDU 200 to the AP 114 or to another client station 154. In an embodiment, the PPDU 200 has a format similar to a PPDU format defined by the IEEE 802.11a Standard.

The PPDU 200 includes a PHY preamble 204 having a short training field (STF) 208, generally used for packet detection, initial synchronization, and automatic gain control (AGC) adjustment, and a long training field (LTF) 212, generally used for channel estimation and fine synchronization. The PPDU 200 also includes a signal field (SIG) 206 that includes PHY parameters corresponding to the data unit 200, such as an indication of a length of the data unit 200, and an indication of a coding rate used to generate and transmit the PPDU 200, for example. The PPDU 200 also includes a data portion 220. The data portion 220 includes one or more MPDUs, MSDUs, an aggregate MPDU (A-MPDU), etc. In some scenarios, the PPDU 200 may omit the data portion 220.

Each of the STF 208, the LTF 212, the SIG 216, and the data portion 220 comprises one or more orthogonal frequency division multiplexing (OFDM) symbols. As merely an illustrative example, the SIG 216 comprises one OFDM symbol.

In an embodiment, the PPDU 200 is downclocked with respect to a PPDU format defined by the IEEE 802.11a Standard. In an embodiment, the PPDU 200 spans a frequency bandwidth equal to or less than 20 MHz (e.g., a bandwidth of the PPDU is selectable from a set of bandwidths that includes 20 MHz, 10 MHz, and 5 MHz). In other embodiments, the bandwidth of the PPDU 200 is selectable from a set of bandwidths that additionally or alternatively includes bandwidths other than 20 MHz, 10 MHz, and 5 MHz (e.g., 1 MHz, 2 MHz, etc.). In an embodiment, the PPDU 200 employs an OFDM tone spacing that is different than a tone spacing defined by the IEEE 802.11a Standard.

Figure 3:
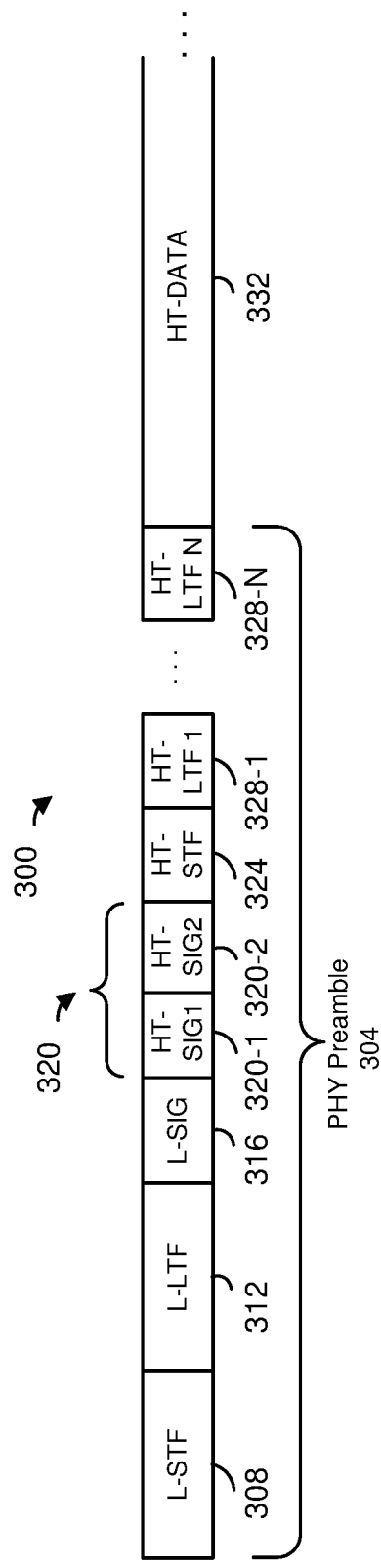
FIG. 3 is a diagram of another example PHY protocol data unit, according another embodiment.

FIG. 3 is a diagram of an example PPDU 300 that the network interface device 122 (FIG. 1) is configured to generate and transmit to one or more client stations 154, according to an embodiment. The network interface device 162 (FIG. 1) may also be configured to generate/transmit PPDUs the same as or similar to the PPDU 300 to the AP 114 or to another client station 154. In an embodiment, the PPDU 300 is similar to a PPDU format defined by the IEEE 802.11n Standard.

The PPDU 300 includes a PHY preamble 304 having a legacy STF (L-STF) 308, a legacy LTF (L-LTF) 312, a legacy SIG (L-SIG) 316, a high throughput (HT) signal field (HT-SIG) 320 including a first HT signal subfield (HT-SIG1) 320-1 and a second HT signal subfield (HT-SIG2) 320-2, an HT short training field (HT-STF) 324, and N data HT long training fields (HT-LTFs) 328, where N is a positive integer generally corresponding to a number of spatial streams used to transmit the PPDU 300 in a multiple input multiple output (MIMO) channel configuration. In an embodiment, N generally corresponds to (e.g., is greater than or equal to) a number of spatial streams via which the PPDU 300 will be transmitted. The HT-SIG 320 includes PHY parameters corresponding to the data unit 300, such as an indication of a modulation and coding scheme (MCS), a number of spatial streams, etc. used to generate and transmit the PPDU 300, for example. The PPDU 300 also includes a data portion 332. The data portion 332 includes one or more MPDUs, MSDUs, an aggregate MPDU (A-MPDU), etc. In some scenarios, the PPDU 300 may omit the data portion 332.

Each of the L-STF 308, the L-LTF 312, the L-SIG 316, the HT-SIG 320, the HT-STF 324, the HT-LTFs 328, and the data portion 332 comprises one or more OFDM symbols. As merely an illustrative example, each of the HT-SIG1 320-1 and the HT-SIG2 320-2 comprises a respective single OFDM symbol. As another example, each HT-LTF 328 comprises a single OFDM symbol.

In an embodiment, the PPDU 300 is downclocked with respect to a PPDU format defined by the IEEE 802.11n Standard. In an embodiment, the PPDU 300 spans a frequency bandwidth equal to or less than 20 MHz (e.g., a bandwidth of the PPDU is selectable from a set of bandwidths that includes 20 MHz, 10 MHz, and 5 MHz). In other embodiments, the bandwidth of the PPDU 300 is selectable from a set of bandwidths that additionally or alternatively includes bandwidths other than 20 MHz, 10 MHz, and 5 MHz (e.g., 1 MHz, 2 MHz, etc.). In an embodiment, the PPDU 300 employs an OFDM tone spacing that is different than a tone spacing defined by the IEEE 802.11n Standard.

Figure 4:
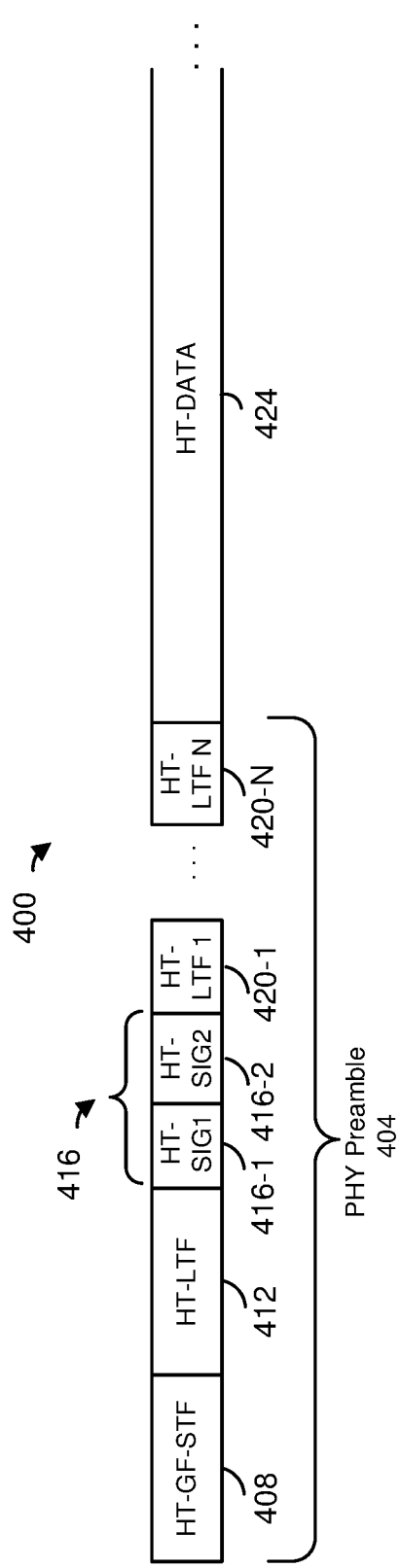
FIG. 4 is a diagram of another example PHY protocol data unit, according another embodiment.

FIG. 4 is a diagram of an example PPDU 400 that the network interface device 122 (FIG. 1) is configured to generate and transmit to one or more client stations 154, according to an embodiment. The network interface device 162 (FIG. 1) may also be configured to transmit PPDUs the same as or similar to the PPDU 400 to the AP 114 or to another client station 154. In an embodiment, the PPDU 400 is similar to a PPDU format defined by the IEEE 802.11n Standard.

The PPDU 400 includes a PHY preamble 404 having an HT Greenfield short training field (HT-GF-STF) 408, an HT-LTF 412, an HT-SIG 416 including an HT-SIG1 416-1 and an HT-SIG2 416-2, and N further HT-LTFs 420, where N is an integer which generally corresponds to a number of spatial streams used to transmit the PPDU 400 in a MIMO channel configuration. The HT-SIG 416 includes PHY parameters associated with the data unit 400, such as an indication of an MCS, an indication of a number of spatial streams, etc. used to generate and transmit the PPDU 400, for example. The PPDU 400 also includes a data portion 424. The data portion 424 includes one or more MPDUs, MSDUs, an A-MPDU, etc. In some scenarios, the PPDU 400 may omit the data portion 424.

Each of the HT-GF-STF 408, the HT-LTF 412, the HT-SIG 416, the HT-LTFs 420 and the data portion 424 comprises one or more OFDM symbols. As merely an illustrative example, each of the HT-SIG1 416-1 and the HT-SIG2 416-2 comprises a respective single OFDM symbol. As another example, each HT-LTF 420 comprises a single OFDM symbol. In an embodiment, the content of HT-SIG 416 is redefined as compared to the IEEE 802.11n Standard to signal PHY information regarding the PPDU 400 that is not provided for in the HT-SIG1 and HT-SIG2 fields defined by the IEEE 802.11n Standard.

In an embodiment, the PPDU 400 is downclocked with respect to a PPDU format defined by the IEEE 802.11n Standard. In an embodiment, the PPDU 400 spans a frequency bandwidth equal to or less than 20 MHz (e.g., a bandwidth of the PPDU is selectable from a set of bandwidths that includes 20 MHz, 10 MHz, and 5 MHz). In other embodiments, the bandwidth of the PPDU 400 is selectable from a set of bandwidths that additionally or alternatively includes bandwidths other than 20 MHz, 10 MHz, and 5 MHz (e.g., 1 MHz, 2 MHz, etc.). In an embodiment, the PPDU 400 employs an OFDM tone spacing that is different than a tone spacing defined by the IEEE 802.11n Standard.

Figure 5:
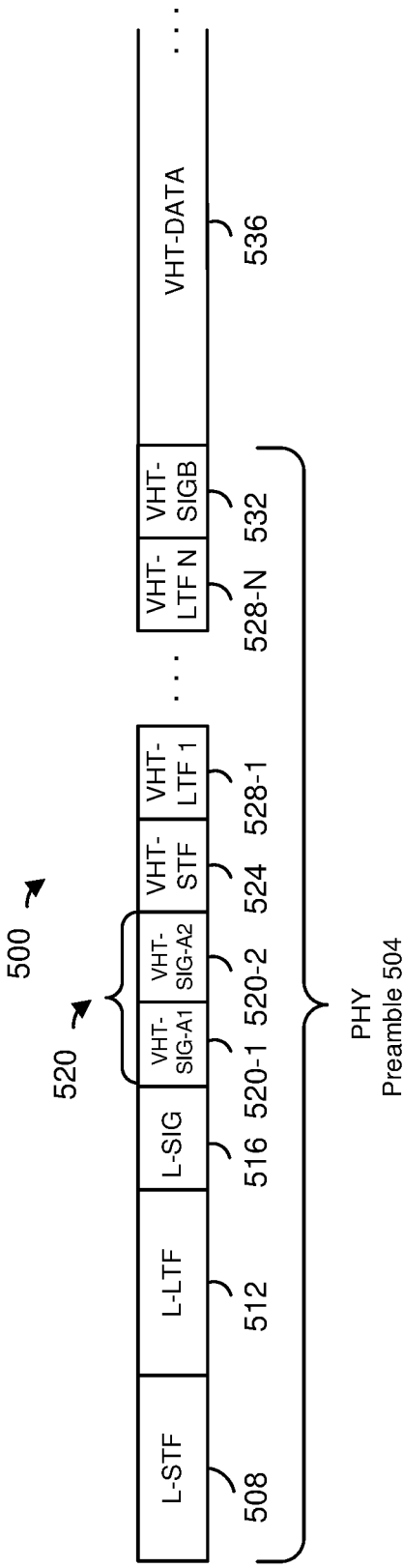
FIG. 5 is a diagram of another example PHY protocol data unit, according another embodiment.

FIG. 5 is a diagram of an example PPDU 500 that the network interface device 122 (FIG. 1) is configured to generate and transmit to one or more client stations 154, according to an embodiment. The network interface device 162 (FIG. 1) may also be configured to transmit PPDUs the same as or similar to the PPDU 500 to the AP 114 or to another client station 154. In an embodiment, the PPDU 500 is similar to a PPDU format defined by the IEEE 802.11ac Standard.

The data unit 500 includes a PHY preamble 504 having an L-STF 508, an L-LTF 512, an L-SIG 516, first very high throughput (VHT) signal field (VHT-SIG-A) 520 including a VHT-SIG-A1 520-1 and a VHT-SIG-A2 520-2, a VHT short training field (VHT-STF) 524, N VHT long training fields (VHT-LTFs) 528, where N is an integer which generally corresponds to a number of spatial streams used to transmit the PPDU 500 in a MIMO channel configuration, and a second VHT signal field (VHT-SIG-B) 536. The data unit 500 also includes a data portion 536. The data portion 536 includes one or more MPDUs, MSDUs, an A-MPDU, etc. In some scenarios, the PPDU 500 may omit the data portion 536.

Each of the L-STF 508, the L-LTF 512, the L-SIG 516, the VHT-SIG-A 520, the VHT-STF 524, the N VHT-LTFs 528, the VHT-SIG-B 532, and the data portion 536 comprises one or more OFDM symbols. As merely an illustrative example, each of the VHT-SIG-A1 520-2 and the VHT-SIG- A2 comprises a respective single OFDM symbol. As another example, each VHT-LTF 528 comprises a single OFDM symbol. In an embodiment, the content of VHT-SIG-A 520 is redefined as compared to the IEEE 802.11ac Standard to signal PHY information regarding the PPDU 500 that is not provided for in the VHT-SIG-A field defined by the IEEE 802.11ac Standard. In an embodiment, the content of VHT-SIG-B 532 is redefined as compared to the IEEE 802.11ac Standard to signal PHY information regarding the PPDU 500 that is not provided for in the VHT-SIG-B field defined by the IEEE 802.11ac Standard. In an embodiment, the VHT-SIG-B 532 is omitted.

In an embodiment, the PPDU 500 is downclocked with respect to a PPDU format defined by the IEEE 802.11ac Standard. In an embodiment, the PPDU 500 spans a frequency bandwidth less than 20 MHz (e.g., a bandwidth of the PPDU is selectable from a set of bandwidths that includes 20 MHz, 10 MHz, and 5 MHz). In other embodiments, the bandwidth of the PPDU 500 is selectable from a set of bandwidths that additionally or alternatively includes bandwidths other than 20 MHz, 10 MHz, and 5 MHz (e.g., 1 MHz, 2 MHz, etc.). In an embodiment, the PPDU 500 employs an OFDM tone spacing that is different than a tone spacing defined by the IEEE 802.11ac Standard.

Figure 6:
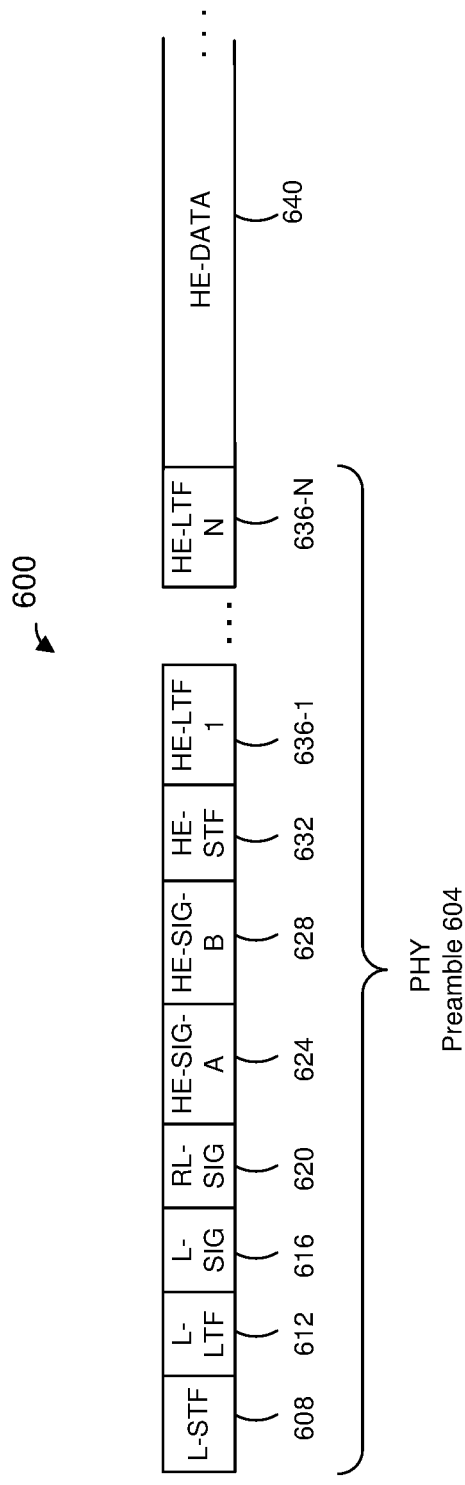
FIG. 6 is a diagram of another example PHY protocol data unit, according another embodiment.

FIG. 6 is a diagram of an example PPDU 600 that the network interface device 122 (FIG. 1) is configured to generate and transmit to one or more client stations 154, according to an embodiment. The network interface device 162 (FIG. 1) may also be configured to transmit PPDUs the same as or similar to the PPDU 600 to the AP 114 or to another client station 154.

The PPDU 600 includes a PHY preamble 604 including an L-STF 608, an L-LTF 612, an L-SIG 616, a repeated L-SIG field (RL-SIG) 620, a high efficiency (HE) signal-A field (HE-SIG-A) 624, an HE signal-B field (HE-SIG-B) 628, an HE short training field (HE-STF) 230, and N HE long training fields (HE-LTFs) 235, where N is a suitable positive integer. In an embodiment, N generally corresponds to (e.g., is greater than or equal to) a number of spatial streams via which the PPDU 600 will be transmitted. The PPDU 600 also includes a PHY data portion 640 and a packet extension (PE) field 644. The PHY data portion 640 includes one or more MPDUs, MSDUs, an A-MPDU, etc. In some scenarios, the PPDU 600 may omit the PHY data portion 640. In some embodiments, the PPDU 600 may omit one or more fields corresponding to the preamble PHY preamble 604. In some embodiments, the PHY preamble 604 includes additional fields not illustrated in FIG. 6. In an embodiment, the PPDU 600 is a downclocked version of a PPDU format defined by a current draft of the IEEE 802.11ax Standard (e.g., IEEE P802.11ax™/D2.2, "Draft Standard for Information technology—Telecommunications and information exchange between systems Local and metropolitan area networks—Specific requirements, Part 11: Wireless LAN Medium Access Control, (MAC) and Physical Layer (PHY) Specifications, Amendment 6: Enhancements for High Efficiency WLAN," IEEE Computer Society, (February 2018), or IEEE P802.11ax™/D2.2, "Draft Standard for Information technology—Telecommunications and information exchange between systems Local and metropolitan area networks—Specific requirements, Part 11: Wireless LAN Medium Access Control, (MAC) and Physical Layer (PHY) Specifications, Amendment 6: Enhancements for High Efficiency WLAN," IEEE Computer Society, (October 2017)).

Each of the L-STF 608, the L-LTF 612, the L-SIG 616, the RL-SIG 620, the HE-SIG-A 624, the HE-SIG-B 628, the HE-STF 632, the N HE-LTFs 636, and the data portion 640 comprises one or more OFDM symbols. As merely an illustrative example, the HE-SIG-A 624 comprises two OFDM symbols. As another example, each HE-LTF 636 comprises a single OFDM symbol. In an embodiment, the content of HE-SIG-A 624 is redefined as compared to the current draft of the IEEE 802.11ax Standard to signal PHY information regarding the PPDU 600 that is not provided for in the HE-SIG-A field defined by the current draft of IEEE 802.11ax Standard. In an embodiment, the content of HE-SIG-B 628 is redefined as compared to the current draft of the IEEE 802.11ax Standard to signal PHY information regarding the PPDU 600 that is not provided for in the HE-SIG-B field defined by the current draft of the IEEE 802.11ax Standard. In an embodiment, the HE-SIG-B 628 is omitted.

In an embodiment, the PPDU 600 is downclocked with respect to a PPDU format defined by the current draft of the IEEE 802.11ax Standard. In an embodiment, the PPDU 600 spans a frequency bandwidth less than 20 MHz (e.g., a bandwidth of the PPDU is selectable from a set of bandwidths that includes 20 MHz, 10 MHz, and 5 MHz). In other embodiments, the bandwidth of the PPDU 600 is selectable from a set of bandwidths that additionally or alternatively includes bandwidths other than 20 MHz, 10 MHz, and 5 MHz (e.g., 1 MHz, 2 MHz, etc.). In an embodiment, the PPDU 600 employs an OFDM tone spacing that is different than a tone spacing defined by the current draft of the IEEE 802.11ax Standard.

Figure 7:
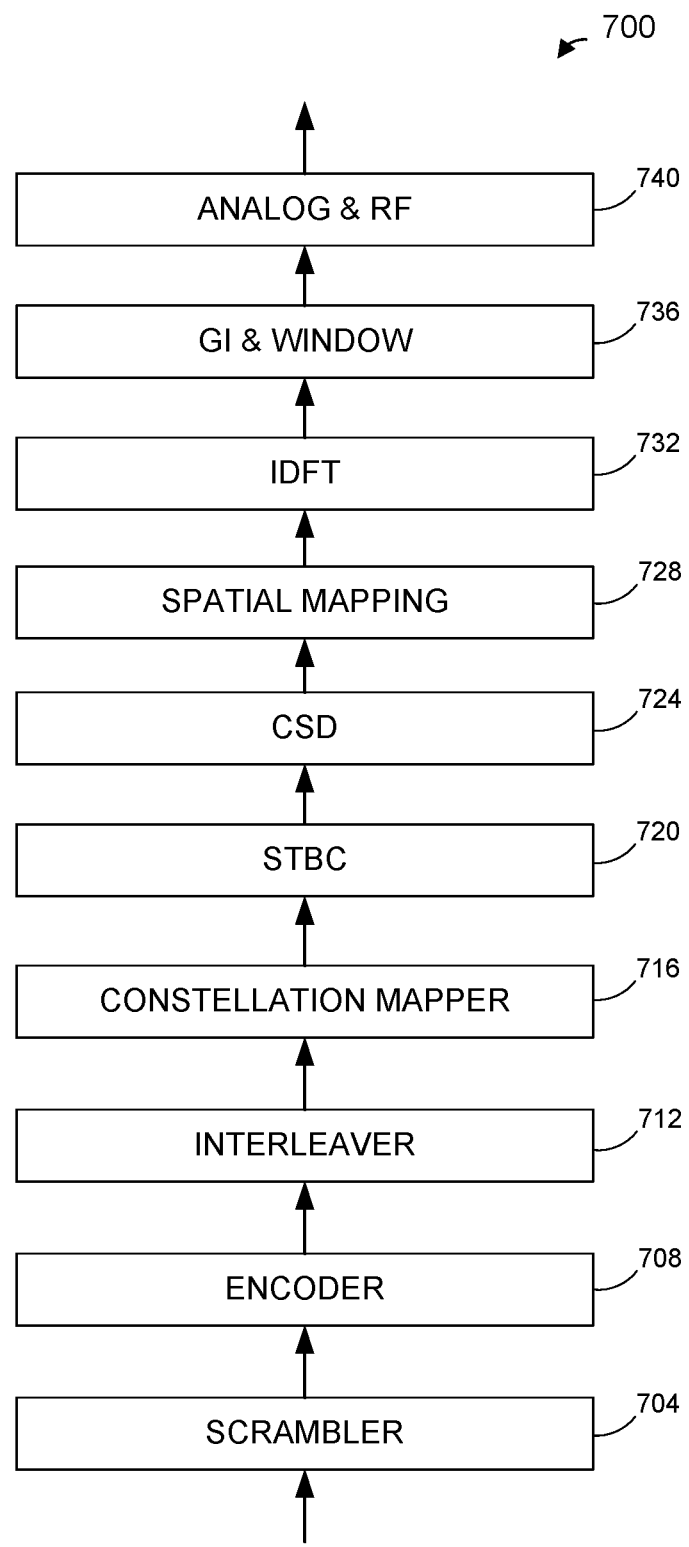
FIG. 7 is block diagram of an example PHY processor for generating PHY protocol data units, according to an embodiment.

FIG. 7 is a block diagram illustrating an example PHY processor 700 for generating PPDUs, according to an embodiment. In an embodiment, the PHY processor 700 corresponds to the PHY processor 130 and/or the PHY processor 170 as described above with respect to FIG. 1. In various embodiments and/or scenarios, the PHY processing unit 700 generates PPDUs such as one or more of the PPDUs 200, 300, 400, 500, and 600, for example. In other embodiments and/or scenarios, the PHY processing unit 700 generates PPDUs having suitable formats other than the PPDUs 200, 300, 400, 500, and 600.

The PHY processing unit 700 includes a scrambler 704 that generally scrambles an information bit stream to reduce the occurrence of long sequences of ones or zeros. An FEC encoder 708 encodes scrambled information bits to generate encoded data bits. In one embodiment, the FEC encoder 708 includes a binary convolutional code (BCC) encoder. In another embodiment, the FEC encoder 708 includes a binary convolutional encoder followed by a puncturing block. In yet another embodiment, the FEC encoder 708 includes a low density parity check (LDPC) encoder.

An interleaver 712 interleaves encoded bits (i.e., changes the order of the bits) to prevent long sequences of adjacent noisy bits from entering a decoder at the receiver. A constellation mapper 716 maps the interleaved sequence of bits to constellation points corresponding to different subcarriers of an OFDM symbol. More specifically, for each spatial stream, the constellation mapper 716 translates every bit sequence of length $\log_2(M)$ into one of M constellation points. In an embodiment, the constellation mapper 716 optionally further implements dual carrier modulation (DCM) whereby a same bit sequence is mapped to two constellation points corresponding to two different subcarriers.

A space-time block coding (STBC) unit 720 applies STBC to map $N_{SS}$ spatial streams to $N_{STS}$ space-time streams. A cyclic shift diversity (CSD) unit 724 inserts a cyclic shift into all but one of the spatial streams to prevent unintentional beamforming. The output of the CSD unit 724 is provided to a spatial mapping unit 728 that maps the $N_{STS}$ space-time streams to $N_{TX}$ transmit chains. An inverse discrete Fourier transform (IDFT) unit 732 operates on each transmit chain and converts constellation points corresponding to a block of subcarriers to a time-domain signal corresponding to an OFDM symbol. A guard interval (GI) insertion and windowing unit 736 prepends, to each OFDM symbol, a circular extension of the OFDM symbol and smooths the edges of each OFDM symbol to increase spectral decay. An analog and radio frequency (RF) unit 740 upconverts a baseband signal corresponding to the OFDM symbols to generate an RF signal for transmission over the communication channel.

In various embodiments and scenarios, the PPDUs 200, 300, 400, 500, and 600 have a 20 MHz frequency bandwidth and are transmitted over a 20 MHz channel. In other embodiments and/or scenarios, the PPDUs 200, 300, 400, 500, and 600 have a frequency bandwidth smaller than 20 MHz (as discussed above) and are transmitted over a channel that is narrower than 20 MHz.

In various embodiments, different numbers of subcarriers are used for a given frequency bandwidth, and thus different subcarrier spacings are employed in the different embodiments.

For instance, in an embodiment, the PPDU 300 is transmitted over a 20 MHz channel with 64 subcarriers (e.g., corresponding to a size 64 FFT), corresponding to a subcarrier frequency spacing of 312.5 kHz, which corresponds to a same clock rate as used in the IEEE 802.11n Standard (i.e., corresponding to a downclocking ratio of one). In another embodiment, the PPDU 300 is transmitted over a 20 MHz channel with 128 subcarriers (e.g., corresponding to a size 128 FFT), corresponding to a subcarrier frequency spacing of 156.25 kHz, which corresponds to a 2-times (2×) downclock (i.e., a downclocking ratio of 1/2) as compared to the clock rate used in the IEEE 802.11n Standard. In another embodiment, the PPDU 300 is transmitted over a 20 MHz channel with 256 subcarriers (e.g., corresponding to a size 256 FFT), corresponding to a subcarrier frequency spacing of 78.125 kHz, which corresponds to a 4-times (4×) downclock (i.e., a downclocking ratio of 1/4 ) as compared to the clock rate used in the IEEE 802.11n Standard.

In an embodiment, the PPDU 400 is transmitted over a 20 MHz channel with 64 subcarriers (e.g., corresponding to a size 64 FFT), corresponding to a subcarrier frequency spacing of 312.5 kHz, which corresponds to a same clock rate as used in the IEEE 802.11n Standard (i.e., corresponding to a downclocking ratio of one). In another embodiment, the PPDU 400 is transmitted over a 20 MHz channel with 128 subcarriers (e.g., corresponding to a size 128 FFT), corresponding to a subcarrier frequency spacing of 156.25 kHz, which corresponds to a 2× downclock as compared to the clock rate used in the IEEE 802.11n Standard. In another embodiment, the PPDU 400 is transmitted over a 20 MHz channel with 256 subcarriers (e.g., corresponding to a size 256 FFT), corresponding to a subcarrier frequency spacing of 78.125 kHz, which corresponds to a 4× downclock as compared to the clock rate used in the IEEE 802.11n Standard.

In an embodiment, the PPDU 500 is transmitted over a 20 MHz channel with 64 subcarriers (e.g., corresponding to a size 64 FFT), corresponding to a subcarrier frequency spacing of 312.5 kHz, which corresponds to a same clock rate as used in the IEEE 802.11ac Standard (i.e., corresponding to a downclocking ratio of one). In another embodiment, the PPDU 500 is transmitted over a 20 MHz channel with 128 subcarriers (e.g., corresponding to a size 128 FFT), corresponding to a subcarrier frequency spacing of 156.25 kHz, which corresponds to a 2× downclock as compared to the clock rate used in the IEEE 802.11ac Standard. In another embodiment, the PPDU 500 is transmitted over a 20 MHz channel with 256 subcarriers (e.g., corresponding to a size 256 FFT), corresponding to a subcarrier frequency spacing of 78.125 kHz, which corresponds to a 4× downclock as compared to the clock rate used in the IEEE 802.11ac Standard.

In an embodiment, the PPDU 600 is transmitted over a 20 MHz channel with 256 subcarriers (e.g., corresponding to a size 256 FFT), corresponding to a subcarrier frequency spacing of 78.125 kHz, which corresponds to a same clock rate as used in the draft IEEE 802.11ax Standard (i.e., corresponding to a downclocking ratio of one).

In an embodiment, the PPDU 300 is transmitted over a 10 MHz channel with 32 subcarriers (e.g., corresponding to a size 32 FFT), corresponding to a subcarrier frequency spacing of 312.5 kHz. In an embodiment, the PPDU 300 is transmitted over a 10 MHz channel with 64 subcarriers (e.g., corresponding to a size 64 FFT), corresponding to a subcarrier frequency spacing of 156.25 kHz, which corresponds to a 2× clock rate as used in the IEEE 802.11n Standard. In another embodiment, the PPDU 300 is transmitted over a 10 MHz channel with 128 subcarriers (e.g., corresponding to a size 128 FFT), corresponding to a subcarrier frequency spacing of 78.125 kHz, which corresponds to a 4× downclock as compared to the clock rate used in the IEEE 802.11n Standard.

In an embodiment, the PPDU 400 is transmitted over a 10 MHz channel with 32 subcarriers (e.g., corresponding to a size 32 FFT), corresponding to a subcarrier frequency spacing of 312.5 kHz. In an embodiment, the PPDU 400 is transmitted over a 10 MHz channel with 64 subcarriers (e.g., corresponding to a size 64 FFT), corresponding to a subcarrier frequency spacing of 156.25 kHz, which corresponds to a 2× clock rate as used in the IEEE 802.11n Standard. In another embodiment, the PPDU 400 is transmitted over a 10 MHz channel with 128 subcarriers (e.g., corresponding to a size 128 FFT), corresponding to a subcarrier frequency spacing of 78.125 kHz, which corresponds to a 4× downclock as compared to the clock rate used in the IEEE 802.11n Standard.

In an embodiment, the PPDU 500 is transmitted over a 10 MHz channel with 32 subcarriers (e.g., corresponding to a size 32 FFT), corresponding to a subcarrier frequency spacing of 312.5 kHz. In an embodiment, the PPDU 500 is transmitted over a 10 MHz channel with 64 subcarriers (e.g., corresponding to a size 64 FFT), corresponding to a subcarrier frequency spacing of 156.25 kHz, which corresponds to a 2× clock rate as used in the IEEE 802.11ac Standard. In another embodiment, the PPDU 500 is transmitted over a 10 MHz channel with 128 subcarriers (e.g., corresponding to a size 128 FFT), corresponding to a subcarrier frequency spacing of 78.125 kHz, which corresponds to a 4× downclock as compared to the clock rate used in the IEEE 802.11ac Standard.

In an embodiment, the PPDU 600 is transmitted over a 10 MHz channel with 256 subcarriers (e.g., corresponding to a size 256 FFT), corresponding to a subcarrier frequency spacing of 30.0625 kHz, which corresponds to a 2× downclock compared to the clock rate used in the draft IEEE 802.11ax Standard. In an embodiment, the PPDU 600 is transmitted over a 10 MHz channel with 128 subcarriers (e.g., corresponding to a size 128 FFT), corresponding to a subcarrier frequency spacing of 78.125 kHz.

In an embodiment, the PPDU 300 is transmitted over a 5 MHz channel with 16 subcarriers (e.g., corresponding to a size 16 FFT), corresponding to a subcarrier frequency spacing of 312.5 kHz. In an embodiment, the PPDU 300 is transmitted over a 5 MHz channel with 64 subcarriers (e.g., corresponding to a size 64 FFT), corresponding to a subcarrier frequency spacing of 78.125 kHz, which corresponds to a 4× clock rate as used in the IEEE 802.11n Standard.

In an embodiment, the PPDU 400 is transmitted over a 5 MHz channel with 16 subcarriers (e.g., corresponding to a size 16 FFT), corresponding to a subcarrier frequency spacing of 312.5 kHz. In an embodiment, the PPDU 400 is transmitted over a 5 MHz channel with 64 subcarriers (e.g., corresponding to a size 64 FFT), corresponding to a subcarrier frequency spacing of 78.125 kHz, which corresponds to a 4× clock rate as used in the IEEE 802.11n Standard.

In an embodiment, the PPDU 500 is transmitted over a 5 MHz channel with 16 subcarriers (e.g., corresponding to a size 16 FFT), corresponding to a subcarrier frequency spacing of 312.5 kHz. In an embodiment, the PPDU 500 is transmitted over a 5 MHz channel with 64 subcarriers (e.g., corresponding to a size 64 FFT), corresponding to a subcarrier frequency spacing of 78.125 kHz, which corresponds to a 4× clock rate as used in the IEEE 802.11ac Standard.

In an embodiment, the PPDU 600 is transmitted over a 5 MHz channel with 256 subcarriers (e.g., corresponding to a size 256 FFT), corresponding to a subcarrier frequency spacing of 19.53125 kHz, which corresponds to a 4× downclock compared to the clock rate used in the draft IEEE 802.11ax Standard. In an embodiment, the PPDU 600 is transmitted over a 5 MHz channel with 64 subcarriers (e.g., corresponding to a size 64 FFT), corresponding to a subcarrier frequency spacing of 78.125 kHz.

In some embodiments, the network interface 122 is configured to transmit/receive PPDUs at different frequency bandwidths such as all of 20 MHz, 10 MHz, and 5 MHz, or only two of 20 MHz, 10 MHz, and 5 MHz. In some embodiments, the network interface 162 is configured to transmit/receive PPDUs at different frequency bandwidths such as all of 20 MHz, 10 MHz, and 5 MHz, or only two of 20 MHz, 10 MHz, and 5 MHz.

In some embodiments, the network interface 122 is additionally or alternatively configured to transmit/receive PPDUs at frequency bandwidths such as both of 2 MHz and 1 MHz, or only one of 2 MHz and 1 MHz. In some embodiments, the network interface 162 is additionally or alternatively configured to transmit/receive PPDUs at frequency bandwidths such as both of 2 MHz and 1 MHz, or only one of 2 MHz and 1 MHz.

In an embodiment, a PPDU corresponding to a lower channel bandwidth may be generated using a format and a process flow that are substantially similar to a format and a process flow of a PPDU corresponding to a higher channel bandwidth except with a reduced subcarrier frequency spacing. In an embodiment, this is accomplished by the use of downclocking in a manner such that OFDM symbols of the PPDU corresponding to the lower channel bandwidth have a longer symbol duration than corresponding OFDM symbols of the PPDU corresponding to the higher channel bandwidth. A longer symbol duration allows a reduced subcarrier frequency spacing, thereby reducing a channel bandwidth necessary for transmission. In an embodiment, the downclocking may be accomplished in the IDFT unit 732 of the PHY processor 700.

As merely an example, a format and process flow of a first PPDU corresponding to a 40 MHz channel may be used to generate a second PPDU corresponding to a 20 MHz channel, except that OFDM symbols of the second PPDU are downclocked by ½ (i.e., OFDM symbol duration doubled) as compared to OFDM symbols of the first PPDU. In an embodiment wherein the first PPDU corresponds to a 40 MHz channel with 128 subcarriers (i.e., 312.5 KHz subcarrier frequency spacing), downclocking OFDM symbols of the first PPDU by 2× results in OFDM symbols of the second PPDU corresponding to a 20 MHz channel with a subcarrier frequency spacing of 156.25 kHz. In various embodiments, OFDM symbols of PPDUs corresponding to channel bandwidths of 20 MHz, 40 MHz, 80 MHz, etc. may be downclocked with appropriate ratios to generate PPDUs corresponding to channel bandwidths of 5 MHz, 10 MHz, 20 MHz, etc. FIG. 8 is a table 800 outlining some ways in which a PPDU including an OFDM symbol corresponding to a first channel bandwidth 804 and a first subcarrier frequency spacing 808 may be downclocked with a downclocking ratio 812 to generate a PPDU including an OFDM symbol corresponding to a lower second channel bandwidth 816 and a lower second subcarrier frequency spacing 820.

In various embodiments, different guard interval durations may be used to generate OFDM symbols corresponding to the PPDUs described above. In an embodiment, a guard interval duration may be selected from a set comprising of 0.8 μs, 1.6 μs, 2.4 μs, 3.2 μs, etc., and the selected guard interval duration may be used to generate one or more OFDM symbols corresponding to the above PPDUs. In an embodiment, a guard interval indication field in a signal field (e.g., the HT-SIG 320/416, the VHT-SIG 520, HE-SIG-A 624, etc.) of a PPDU may be used to indicate the selected guard interval duration used for generating one or more OFDM symbols (e.g., in a data portion of the PPDU).

A set of parameters for transmitting a PPDU such as described above is sometimes referred to as an OFDM numerology. An OFDM numerology is a set of parameters that includes at least i) a channel bandwidth, and ii) a number of OFDM subcarriers (e.g., corresponding to an FFT size or a discrete Fourier transform (DFT) size). The channel bandwidth and the number of OFDM subcarriers for a particular OFDM numerology implies a particular OFDM subcarrier spacing, and thus an OFDM numerology may also be considered to include an OFDM subcarrier spacing parameter, in an embodiment. In some embodiments, an OFDM numerology defined by a communication protocol includes different numbers of OFDM subcarriers for different portions of a PPDU. For example, the communication protocol may specify that a PHY data portion utilizes a first number of OFDM subcarriers, whereas the communication protocol may specify that the PHY preamble utilizes a second number of OFDM subcarriers, according to an embodiment.

In various embodiments, multiple spatial streams may be used to transmit PPDUs described above. In an embodiment, a number of spatial streams $N_{SS}$ field in a signal field (e.g., the HT-SIG 320/416, the VHT-SIG 520, HE-SIG-A 624, etc.) of a PPDU may be used to indicate a number of spatial streams corresponding to the PPDU.

Packets (e.g., the PPDUs described above) generated by communication devices such as the network interface device 122 and/or the network interface device 162 sometimes include both a PHY preamble and one or more PHY midambles to allow a receiving device to update channel estimation, adjust synchronization, etc., during reception of a single packet. For example, if the packet is relatively long, in situations such as when a channel is particularly noisy, in situations such as when relative movement between a transmitting device and a receiving device causes a Doppler effect, and/or in situations such as when movement of objects in the environment causes a Doppler effect, etc., refining a channel estimate and/or synchronization more than once during the reception of a single packet unit may be beneficial. A transmitting device generates the PHY preamble and one or more PHY midambles so as to allow a receiving device to estimate a communication channel between the transmitting device and the receiving device and/or to refine synchronization during reception of the packet, and accordingly demodulate a data payload of the packet.

Accordingly, one or more PHY midambles are included within a data portion of the packet, e.g., each PHY midamble is adjacent to data from the payload at both a beginning of the PHY midamble and an end of the PHY midamble. Each PHY midamble includes one or more OFDM symbols that include training information (sometimes referred to as calibration information), at least a portion of which may be used for one or more of retraining channel training or estimation, refining frequency synchronization or carrier frequency offset (CFO) adjustment, calculating a steering matrix or other parameters used in beamforming, adapting to a communication link, AGC adjustment, etc. Embodiments of PHY midambles described herein may have particular applicability to communication systems in which a packet duration is longer than durations of channel coherence, such as in wireless systems that use shorter wavelengths, and/or in communication systems that experience a Doppler effect.

Figure 9:
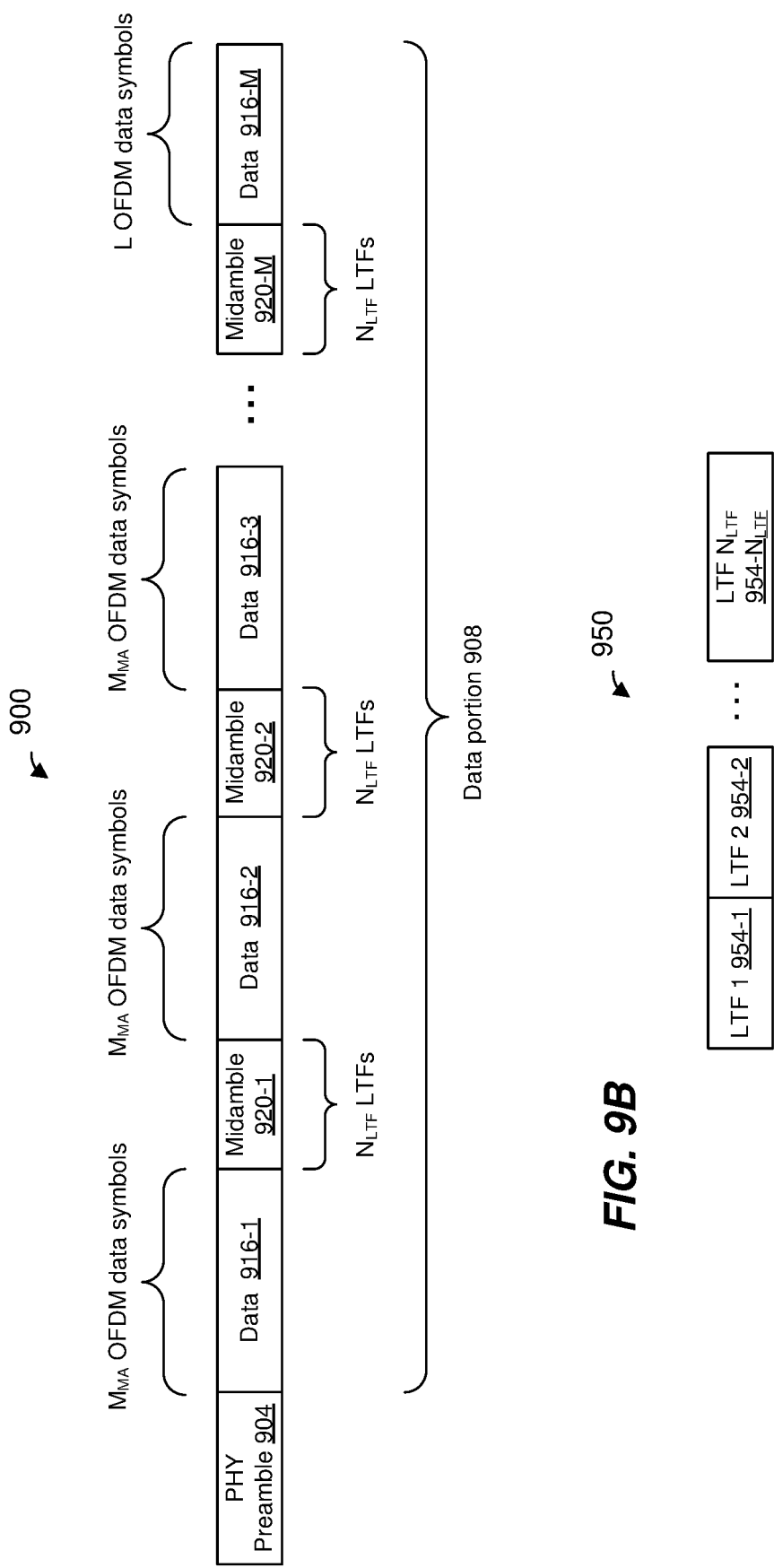
FIG. 9A is a diagram of an example PHY protocol data unit having PHY midambles, according to an embodiment.
FIG. 9B is a diagram of an example PHY midamble of the PHY protocol data unit of FIG. 9A, according to an embodiment.

FIG. 9A is a diagram of an example PPDU 900, according to an embodiment. In an embodiment, the network interface device 122 (FIG. 1) is configured to generate and transmit the PPDU 900, and the network interface device 162 (FIG. 1) is configured to receive and process the PPDU 900. In some embodiments, the network interface device 162 (FIG. 1) is configured to generate and transmit the PPDU 900, and the network interface device 122 (FIG. 1) is configured to receive and process the PPDU 900. The PPDU 900 may occupy a 20 MHz bandwidth or another suitable bandwidth. Data units similar to the PPDU 900 occupy other suitable bandwidth such as 1 MHz, 2 MHz, 5 MHz, 10 MHz, for example, or other suitable bandwidths, in other embodiments.

The PPDU 900 includes a PHY preamble 904 and a PHY data portion 908. In various embodiments, elements of the PPDU 900 are similar to the PPDU 200/300/400/500/600 described above, wherein the PHY preamble 904 corresponds to the PHY preamble 204/304/404/504/604 and the data portion 908 corresponds to the data portion 220/332/424/536/640.

The PHY data portion 908 includes a data payload comprising a plurality of OFDM data symbols partitioned into a plurality of data portions 916, between which are located one or more PHY midambles 920. A number of OFDM data symbols, in the data portion 916, between two consecutive PHY midambles 920 is referred to herein as a midamble periodicity $M_{MA}$. Within the PHY data portion 908, a PHY midamble 920 is inserted after every $M_{MA}$ OFDM data symbols. In an embodiment, a last data portion 916-M may have a number of OFDM symbols L that is different from $M_{MA}$. In another embodiment, however, L is equal to $M_{MA}$. In an embodiment, a number of the data portions 916 and a number of the PHY midambles 920 are identical. In another embodiment, a number of data portions 916 and a number of PHY midambles 920 are different from each other. For instance, in an embodiment, the number of PHY midambles 920 is one less than the number of data portions 916.

In an embodiment, each PHY midamble 920 includes $N_{LTF}$ LTFs, where $N_{LTF}$ is a suitable positive integer. In an embodiment, LTFs included in the PHY midamble 920 are identical to (e.g., have content that is the same as), or similar to, the LTFs included in the PHY preamble 904. For instance, in an embodiment wherein the PPDU 900 corresponds to the PPDU 600, each PHY midamble 920 includes fields that are identical (e.g., formatted, encoded, modulated, etc., in a manner that is identical) to HE-LTFs 636. In another embodiment wherein the PPDU 900 corresponds to the PPDU 500, each PHY midamble 920 includes fields that are identical (e.g., formatted, encoded, modulated, etc., in a manner that is identical) to VHT-LTFs 528. In another embodiment wherein the PPDU 900 corresponds to the PPDU 400, each PHY midamble 920 includes fields that are identical (e.g., formatted, encoded, modulated, etc., in a manner that is identical) to HT-LTFs 420. In another embodiment wherein the PPDU 900 corresponds to the PPDU 300, each PHY midamble 920 includes fields that are identical (e.g., formatted, encoded, modulated, etc., in a manner that is identical) to HT-LTFs 328. In another embodiment wherein the PPDU 900 corresponds to the PPDU 200, each PHY midamble 920 includes a field that is identical (e.g., formatted, encoded, modulated, etc., in a manner that is identical) to the LTF 212. In another embodiment, however, each PHY midamble additionally or alternatively includes LTFs that are different from LTFs included in the PHY preamble 904.

FIG. 9B is a diagram of an example PHY midamble 950 that is included in the PPDU 900 of FIG. 9A (e.g., each PHY midamble 920 includes the PHY midamble 950), according to an embodiment.

The PHY midamble 950 consists of $N_{LTF}$ LTFs 954, where $N_{LTF}$ is a suitable positive integer. In an embodiment, $N_{LTF}$ generally corresponds to (e.g., is greater than or equal to) a number of spatial streams ($N_{STS}$) via which the PPDU 900 will be transmitted. In an embodiment, a number of LTFs ($N_{LTF}$) 954 in the PHY midamble 950 is equal to a number of LTFs in the PHY preamble (i.e., the PHY preamble 904). In another embodiment, however, the number of LTFs 954 in the PHY midamble 950 is different from a number of LTFs in the PHY preamble (i.e., the PHY preamble 904). In an embodiment, each LTF 954 corresponds to a single OFDM symbol.

In other embodiments, the PHY midamble 950 includes one or more of: a short training field, a signal field, or another suitable field used in PHY preambles.

In some embodiments, $M_{MA}$ corresponding to a PPDU is determined based on one or more parameters such as: communication protocol corresponding to the PPDU, format of the PPDU, transmission channel bandwidth of the PPDU, subcarrier frequency spacing, etc. In some embodiments, a corresponding set comprising of one or more values of $M_{MA}$ is defined for each combination of one or more of the above parameters. For instance, for generation and transmission of a PPDU, a set of one or more values of $M_{MA}$ is determined based on one or more above parameters of the PPDU, and a particular value of $M_{MA}$ is selected from the determined set. The selected $M_{MA}$ is used for generating the PHY midambles 920 in the data portion 908 of the PPDU, as described above with reference to FIG. 9.

In an embodiment, a value of $M_{MA}$ is selected from a set of valid midamble periodicity values. In an embodiment, the set consists of two values. In another embodiment, the set consists of four values.

In an embodiment, a set of one or more values of $M_{MA}$ is defined corresponding to a default subcarrier spacing value and scaled to determine corresponding one or more values of $M_{MA}$ corresponding to other subcarrier spacing values. For instance, in an embodiment, a PPDU corresponding to a default subcarrier frequency spacing of 312.5 kHz is generated using an $M_{MA}$ selected from a set {16 40 80 160}, a PPDU corresponding to a subcarrier frequency spacing of 156.25 kHz (i.e. N=2) is generated using an $M_{MA}$ selected from a set {8 20 40 80}, a PPDU corresponding to a subcarrier frequency spacing of 78.125 kHz (i.e. N=4) is generated using an $M_{MA}$ selected from a set {4 10 20 40}, and a PPDU corresponding to a subcarrier frequency spacing of 39.0625 kHz (i.e. N=8) is generated using an $M_{MA}$ selected from a set {2 5 10 20}.

In another embodiment, respective sets of one or more values of $M_{MA}$ are defined for corresponding subcarrier spacings. In another embodiment, respective sets of one or more values of $M_{MA}$ are defined for corresponding channel frequency bandwidths.

LTFs included in the PHY preamble 904 and/or the PHY midamble 920 are encoded with training sequence values. In an embodiment, the training sequence values correspond to a predefined sequence comprising of +1s and −1s that are encoded on different subcarriers of OFDM symbols corresponding to the LTFs. In an embodiment, LTFs included in the PHY preamble 904 and/or the PHY midamble 920 may support different compression modes corresponding to a different number of subcarriers including a training sequence value. For instance, in various embodiments, not all subcarriers in an OFDM symbol corresponding to an LTF include a non-zero training sequence value. For example, in some embodiments, only every n-th subcarrier is set to a non-zero value, whereas the remaining subcarriers in between are set to zero. This results in a time-domain sequence that repeats n times. In an embodiment, only one of the instances of the time-domain sequence is transmitted, resulting in a 1/n compression of the time duration of the LTF. In an embodiment, every fourth subcarrier of an OFDM symbol corresponding to an LTF is configured to include a non-zero training sequence value whereas the remaining subcarriers in between are set to zero, and only one instance of the resulting time-domain sequence is transmitted (sometimes referred to as a "1×LTF compression mode"). In another embodiment, every second subcarrier of an OFDM symbol corresponding to an LTF is configured to include a non-training sequence value (sometimes referred to as a "2×LTF compression mode") whereas the remaining subcarriers in between are set to zero, and only one instance of the resulting time-domain sequence is transmitted. In another embodiment, every subcarrier of an OFDM symbol corresponding to an LTF is configured to include a non-training sequence value (sometimes referred to as a "4×LTF compression mode"). In such embodiments, the 4× LTF compression mode has an LTF time duration that is four times an LTF time duration of the 1×LTF compression mode, and twice an LTF time duration of the 2×LTF compression mode; the 2×LTF compression mode has an LTF time duration that is twice the LTF time duration of the 1×LTF compression mode.

In an embodiment, LTFs included in the PHY preamble 904 and LTFs included in the PHY midambles 920 are formatted using corresponding different compression modes. In other embodiments, however, LTFs included in the PHY preamble 904 and LTFs included in the PHY midambles 920 are formatted using a same compression mode.

In an embodiment, a communication protocol defines different joint LTF compression/guard interval (GI) duration modes. For example, in some embodiments, only certain GI durations can be used with certain LTF compression modes, in an embodiment. In an embodiment, a signal field in the PHY preamble 904 of the PPDU 900 includes a subfield that indicates a LTF compression/GI duration mode that is used in the PPDU 900, e.g., indicates an LTF compression used for LTFs in the preamble and/or the midambles 920 and a GI duration used at least in connection with the OFDM data symbols 916.

In an embodiment, a signal field in the PHY preamble 904 of the PPDU 900 includes one or more fields that indicate a presence of the PHY midambles 920, and/or the midamble periodicity $M_{MA}$ corresponding to the PPDU 900. In an embodiment wherein the PHY preamble 904 corresponds to the PHY preamble 304/404, the HT-SIG 320/HT-SIG 416 includes one or more fields that indicate a presence of the PHY midambles 920 and/or the midamble periodicity $M_{MA}$. In an embodiment wherein the PHY preamble 904 corresponds to the PHY preamble 504, the VHT-SIG-A 520 includes one or more fields that indicate a presence of the PHY midambles 920 and/or the midamble periodicity $M_{MA}$. In an embodiment wherein the PHY preamble 904 corresponds to the PHY preamble 604, the HE-SIG-A 624 includes one or more fields that indicate a presence of the PHY midambles 920 and/or the midamble periodicity $M_{MA}$. In an embodiment, a presence of the PHY midambles 920 need not be signaled if the PPDU 900 is configured to compulsorily include the PHY midambles 920.

In various embodiment, PPDUs discussed above with reference to FIGS. 2-6 include a signal field, in a PHY preamble, that is smaller (e.g., includes a lesser number of bits) than signal fields discussed above (i.e., the HT-SIG 320/416, the VHT-SIG 520, and HE-SIG-A 624). For instance, in at least some embodiments, less information in the signal field is required than information in signal fields defined by the IEEE 802.11n, 802.11ac, and 802.11ax standards discussed above (i.e., the HT-SIG 320/416, the VHT-SIG 520, and HE-SIG-A 624). In some such embodiments, the HT-SIG 320/416, the VHT-SIG 520, or HE-SIG-A 624 may be replaced with a shorter signal (SIG) field that includes information such as GI duration, MCS, midamble periodicity $M_{MA}$, number of LTFs, LTF compression mode, whether LDPC is utilized, whether BCC is utilize, whether DCM is utilized, whether STBC is utilized, a number of spatial streams $N_{SS}$, etc., corresponding to the PPDU. In an embodiment, the shorter SIG field comprises of a single OFDM symbol. In other such embodiments, the HT-SIG 320/416, the VHT-SIG 520, or HE-SIG-A 624 is modified (as compared to the IEEE 802.11n Standard, the IEEE 802.11ac Standard, and the current draft of the IEEE 802.11ax Standard) to omit one or more subfields that are not required by the communication protocol used in the network 110 (FIG. 1), and/or to include subfields that are not defined by the IEEE 802.11n Standard, the IEEE 802.11ac Standard, or the current draft of the IEEE 802.11ax Standard, for the HT-SIG 320/416, the VHT-SIG 520, or HE-SIG-A 624.

In some embodiments, PPDUs such as discussed above are generated according to an extended range (ER) mode that provides a greater transmission mode and/or improves receiver sensitivity. For example, an ER mode uses one or more of i) DCM, ii) bit repetition, etc., and/or is restricted to using one or more MCSs that provide more robust modulation/encoding and lower data rates as compared to other MCSs that can be used in one or more non-ER modes, according to some embodiments. In embodiments that provide an ER mode, the signal field in the PHY preamble 304, the PHY preamble 404, the PHY preamble 504, PHY preamble 604, the PHY preamble 904, etc., includes a subfield that indicates whether the ER mode is used in connection with the corresponding PPDU.

Figure 10:
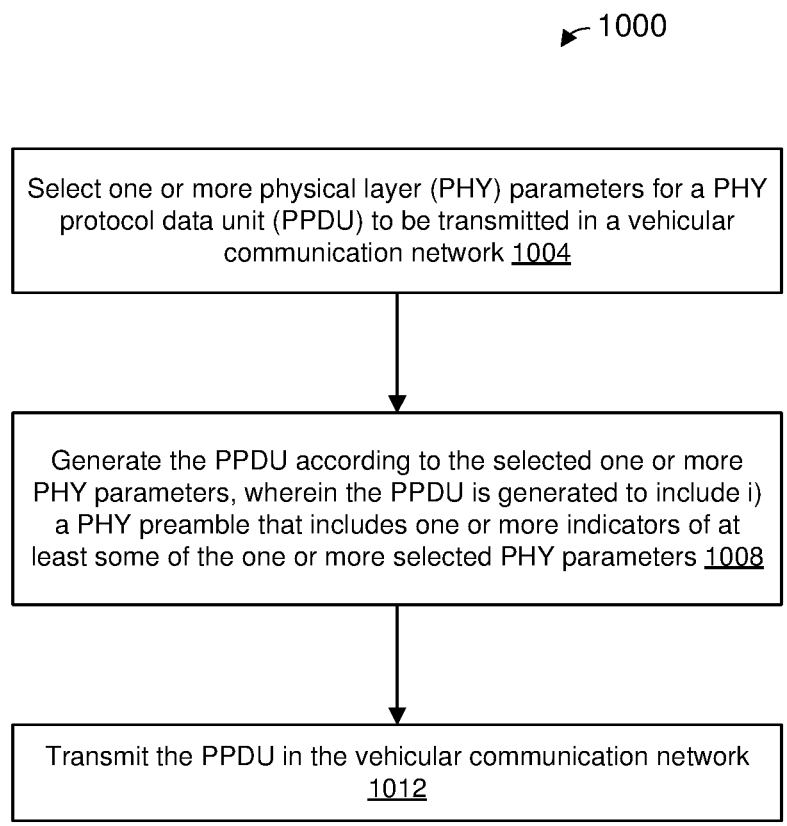
FIG. 10 is a flow diagram of an example method for generating and transmitting a PHY data unit, according to an embodiment.

FIG. 10 is a flow diagram of an example method 1000 for generating and transmitting a PPDU in a vehicular communication network, according to an embodiment. With reference to FIG. 1, the method 1000 is implemented by a network interface device such as the network interface device 122 or the network interface device 162, in various embodiments. For example, in one such embodiment, a PHY processor such as the PHY processor 130 or the PHY processor 170 is configured to implement at least a portion of the method 1000. According to another embodiment, a MAC processor such as the MAC processor 126 or the MAC processor 166 is also configured to implement a portion of the method 1000.

At block 1004, one or more PHY parameters for the PPDU are selected.

In an embodiment, block 1004 includes selecting a downclocking ratio. In an embodiment, the downclocking ratio is selected based on a selected frequency bandwidth for the PPDU. In an embodiment, the downclocking ratio is selected from a set that consists of 1, 1/2, and 1/4. In an embodiment, the downclocking ratio 1 corresponds to a 20 MHz bandwidth, the downclocking ratio 1/2 corresponds to a 10 MHz bandwidth, and the downclocking ratio 1/4 corresponds to a 5 MHz bandwidth. In another embodiment, the downclocking ratios 1, 1/2, and/or 1/4 corresponds to other suitable bandwidths. In another embodiment, the downclocking ratio is selected from a set that additionally or alternatively includes downclocking ratios other than 1, 1/2, or 1/4, such as 1/5, 1/10, 1/20, etc.

In an embodiment, block 1004 includes selecting a frequency bandwidth for the PPDU from a set of frequency bandwidths defined by a communication protocol. In an embodiment, the set of frequency bandwidths includes at least two frequency bandwidths. In another embodiment, the set of frequency bandwidths includes at least three frequency bandwidths. In an embodiment, the set of frequency bandwidths includes at least 20 MHz, and 10 MHz. In an embodiment, the set of frequency bandwidths includes at least 20 MHz, 10 MHz, and 5 MHz. In an embodiment, the set of frequency bandwidths includes at least 10 MHz, and 5 MHz. In an embodiment, the set of frequency bandwidths includes at least 5 MHz and 2 MHz. In an embodiment, the set of frequency bandwidths includes at least 5 MHz and 1 MHz. In other embodiments, the set of frequency bandwidths additionally or alternatively includes one or more suitable frequency bandwidths other than 20 MHz, 10 MHz, 5 MHz, 2 MHz, and 1 MHz.

In an embodiment, all of the frequency bandwidths in the set of frequency bandwidths defined by the communication protocol correspond to a same OFDM subcarrier spacing. In an embodiment, the OFDM subcarrier spacing is 312.5 kHz. In another embodiment, the OFDM subcarrier spacing is 156.25 kHz. In another embodiment, the OFDM subcarrier spacing is 78.125 kHz. In another embodiment, the OFDM subcarrier spacing is 39.0625 kHz. In another embodiment, the OFDM subcarrier spacing is a suitable OFDM subcarrier spacing other than 312.5 kHz, 156.25 kHz, 78.125 kHz, and 39.0625 kHz.

In an embodiment, at least two of the frequency bandwidths in the set of frequency bandwidths defined by the communication protocol correspond to a first OFDM subcarrier spacing, while at least one of the frequency bandwidths in the set of frequency bandwidths correspond to a second OFDM subcarrier spacing. In an embodiment, the second OFDM subcarrier spacing is 1/N multiplied by the first OFDM subcarrier spacing, where N is a suitable positive integer less than 100. In an embodiment, N is an even positive integer less than 100. In an embodiment, N is two. In another embodiment, N is four. In another embodiment, N is eight. In another embodiment, N is sixteen. In an embodiment, the first OFDM subcarrier spacing is 312.5 kHz, and the second OFDM subcarrier spacing is 156.25 kHz. In another embodiment, the first OFDM subcarrier spacing is 156.25 kHz, and the second OFDM subcarrier spacing is 78.125 kHz. In another embodiment, the first OFDM subcarrier spacing is 78.125 kHz, the second OFDM subcarrier spacing is 39.0625 kHz. In another embodiment, the first OFDM subcarrier spacing and the second OFDM subcarrier are suitable OFDM subcarrier spacings other than 312.5 kHz, 156.25 kHz, 78.125 kHz, and 39.0625 kHz.

In an embodiment, at least three of the frequency bandwidths in the set of frequency bandwidths defined by the communication protocol correspond to different subcarriers spacings: a first OFDM subcarrier spacing, a second OFDM subcarrier spacing, and a third OFDM subcarrier spacing. In an embodiment, the second OFDM subcarrier spacing is 1/N multiplied by the first OFDM subcarrier spacing, and the third OFDM subcarrier spacing is 1/N multiplied by the second OFDM subcarrier spacing, where N is a suitable positive integer less than 100. In an embodiment, N is an even positive integer less than 100. In an embodiment, N is two. In another embodiment, N is four. In another embodiment, N is eight. In another embodiment, N is sixteen. In an embodiment, the first OFDM subcarrier spacing is 312.5 kHz, the second OFDM subcarrier spacing is 156.25 kHz, and the third OFDM subcarrier spacing is 78.125 kHz. In another embodiment, the first OFDM subcarrier spacing is 156.25 kHz, the second OFDM subcarrier spacing is 78.125 kHz, and the third OFDM subcarrier spacing is 39.0625 kHz. In another embodiment, the first OFDM subcarrier spacing and the second OFDM subcarrier are suitable OFDM subcarrier spacings other than 312.5 kHz, 156.25 kHz, 78.125 kHz, and 39.0625 kHz.

In an embodiment, block 1004 includes selecting a guard interval (GI) duration for the PPDU from a set of GI durations defined by a communication protocol. In an embodiment, the set of GI durations includes at least four GI durations. In an embodiment, the set of GI durations is {0.8 μs, 1.6 μs, 2.4 μs, 3.2 μs}. In another embodiment, the set of frequency bandwidths includes at least 0.8 μs, 1.6 μs, 2.4 μs, and 3.2 μs. In another embodiment, the set of frequency bandwidths includes at least three GI durations. In other embodiments, the set of GI durations additionally or alternatively includes one or more suitable frequency GI durations other than 0.8 μs, 1.6 μs, 2.4 μs, and 3.2 μs. In some embodiments, the communication protocol defines only a single GI duration and block 1004 does not include selecting a GI duration for the PPDU.

In some embodiments, the PPDU includes a PHY preamble having one or more training fields such as LTFs or other suitable training fields, and the communication protocol specifies a set of compression modes for the training fields such as described above. In an embodiment, block 1004 includes selecting a compression mode for training fields in the PPDU from a set of training field compression modes defined by the communication protocol. In some embodiments, the communication protocol does not define multiple training field compression modes and block 1004 does not include selecting a training field compression mode for the PPDU.

In an embodiment, the communication protocol defines a set of GI duration, training field compression mode tuples, and block 1004 includes selecting a GI duration, training field compression mode tuple for the PPDU from a set of set of GI duration, training field compression mode tuples defined by the communication protocol. In some embodiments, the communication protocol does not define multiple GI duration, training field compression mode tuples, and block 1004 does not include selecting a GI duration, training field compression mode tuple for the PPDU.

In an embodiment, block 1004 includes determining that one or more PHY midambles are to be included in the PPDU. In an embodiment in which different OFDM subcarrier spacings are permissible by the communication protocol (e.g., different frequency bandwidths correspond to different OFDM subcarrier spacings), block 1004 also includes selecting a set of permissible midamble periodicity values, from among a plurality of sets of permissible midamble periodicity values, based on the selected frequency bandwidth. For example, different sets of permissible midamble periodicity values correspond to different OFDM subcarrier spacings, in an embodiment. In an embodiment, block 1004 includes selecting a midamble periodicity value from the selected set of permissible midamble periodicity values. In some embodiments, the communication protocol defines only a single set of permissible midamble periodicity values, and block 1004 does not include selecting a set of permissible midamble periodicity values. In some embodiments, the communication protocol requires that all PPDUs require one or more PHY midambles, and block 1004 does not include determining whether one or more PHY midambles are to be included in the PPDU. In some embodiments, the communication protocol does not permit PHY midambles, and block 1004 does not include determining whether one or more PHY midambles are to be included in the PPDU.

In an embodiment, each PHY midamble includes one or more LTFs. In an embodiment, block 1004 includes selecting an LTF compression mode for LTFs in the one or midambles separately from selecting an LTF compression mode for LTFs in the PHY preamble. In another embodiment, the LTF compression mode for the one or midambles must be the same as the LTF compression mode for LTFs in the PHY preamble, and block 1004 does not include selecting an LTF compression mode for LTFs in the one or midambles separately from selecting an LTF compression mode for LTFs in the PHY preamble.

In an embodiment, block 1004 includes determining a number of spatial streams for transmitting the PPDU. In another embodiment, the communication protocol only permits transmitting using a single spatial stream, and block 1004 does not include determining a number of spatial streams for transmitting the PPDU.

In an embodiment, block 1004 includes determining whether to use STBC for the PPDU. In another embodiment, the communication protocol does not permit using STBC, and block 1004 does not include determining whether to use STBC for the PPDU. In another embodiment, the communication protocol requires STBC to be used for all PPDUs, and block 1004 does not include determining whether to use STBC for the PPDU.

In an embodiment, block 1004 includes determining whether to use DCM for the PPDU. In another embodiment, the communication protocol does not permit using DCM, and block 1004 does not include determining whether to use DCM for the PPDU. In another embodiment, the communication protocol requires using DCM for all PPDUs, and block 1004 does not include determining whether to use DCM for the PPDU.

In an embodiment, block 1004 includes determining whether to use an extended range mode for the PPDU. In another embodiment, the communication protocol does not define an extended range mode, and block 1004 does not include determining whether to use the extended range mode for the PPDU.

In an embodiment, block 1004 includes determining whether to use LDPC for the PPDU. In another embodiment, the communication protocol does not permit using LDPC, and block 1004 does not include determining whether to use LDPC for the PPDU. In another embodiment, the communication protocol requires using LDPC for all PPDUs, and block 1004 does not include determining whether to use LDPC for the PPDU.

At block 1008, the PPDU is generated in accordance with the one or more PHY parameters determined and/or selected at block 1004. In an embodiment, block 1008 includes generating the PPDU i) according to the downclocking ratio selected at block 1004, and ii) as a downclocked version of a PPDU format defined by the IEEE 802.11n Standard. In an embodiment, generating the PPDU as a downclocked version of a PPDU format defined by the IEEE 802.11n Standard includes generating the PPDU to include a PHY preamble with one or more modified signal fields as compared to signal fields defined by the IEEE 802.11n Standard.

In another embodiment, block 1008 includes generating the PPDU i) according to the downclocking ratio selected at block 1004, and ii) as a downclocked version of a PPDU format defined by the IEEE 802.11ac Standard. In an embodiment, generating the PPDU as a downclocked version of a PPDU format defined by the IEEE 802.11ac Standard includes generating the PPDU to include a PHY preamble with one or more modified signal fields as compared to signal fields defined by the IEEE 802.11ac Standard.

In an embodiment, block 1008 includes generating the PPDU i) according to the downclocking ratio selected at block 1004, and ii) as a downclocked version of a PPDU format defined by the current draft of the IEEE 802.11ax Standard. In an embodiment, generating the PPDU as a downclocked version of a PPDU format defined by the current draft of the IEEE 802.11ax Standard includes generating the PPDU to include a PHY preamble with one or more modified signal fields as compared to signal fields defined by the current draft of the IEEE 802.11ax Standard.

In an embodiment, block 1008 includes generating the PPDU to include a PHY preamble, where the PHY preamble indicates at least some of the one or more PHY parameters determined and/or selected at block 1004. In an embodiment, block 1008 includes generating the PHY preamble to indicate all of the one or more PHY parameters determined and/or selected at block 1004. In an embodiment, generating the PHY preamble includes generating a signal field of the PHY preamble, and wherein the signal field is generated to indicate at least some of the one or more PHY parameters determined and/or selected at block 1004. In an embodiment, block 1008 includes generating the signal field of the PHY preamble to indicate all of the one or more PHY parameters determined and/or selected at block 1004. In an embodiment, the signal field is a single contiguous field that is immediately adjacent to i) a training field in the PHY preamble, and ii) another training field in the PHY preamble or a PHY data portion of the PPDU; and the entire signal field is modulated on a single OFDM symbol.

At block 1012, the PPDU is transmitted in the vehicular communication network.

Figure 11:
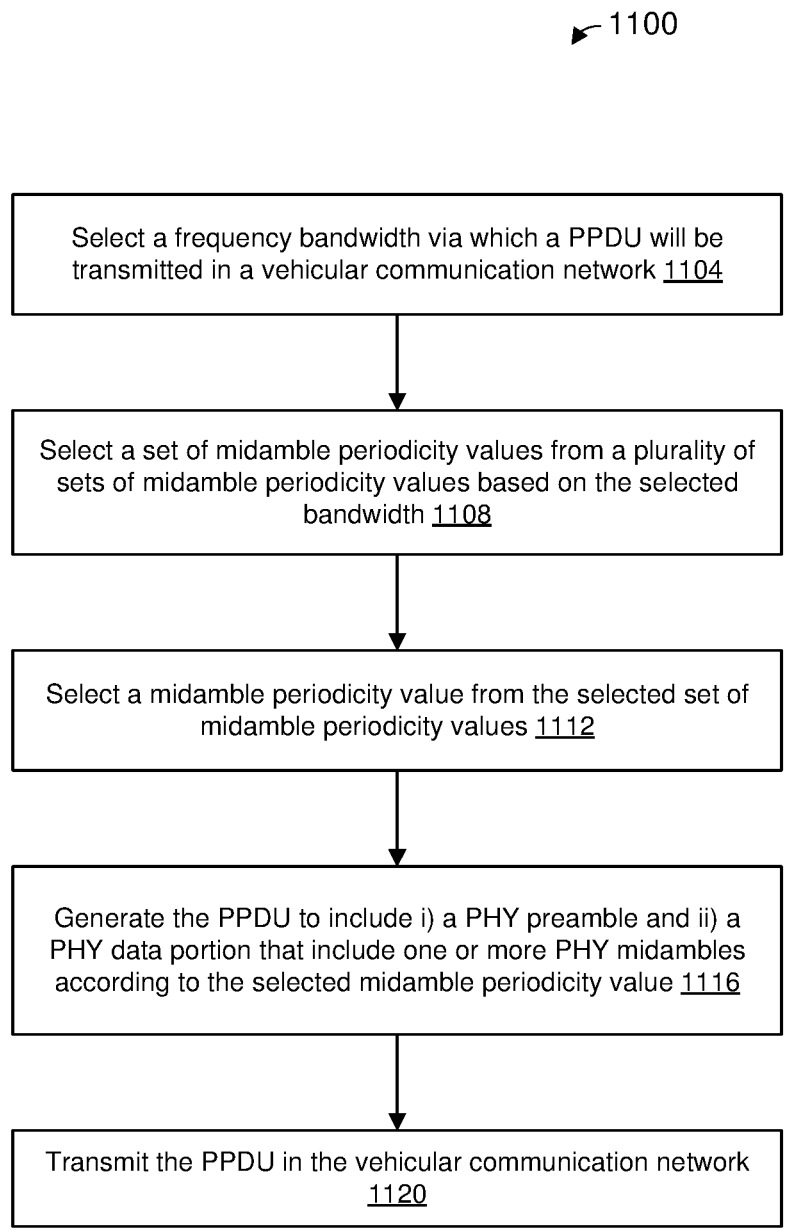
FIG. 11 is a flow diagram of another example method for generating and transmitting a PHY data unit, according to another embodiment.

FIG. 11 is a flow diagram of another example method 1100 for generating and transmitting a PPDU in a vehicular communication network, according to an embodiment. With reference to FIG. 1, the method 1100 is implemented by a network interface device such as the network interface device 122 or the network interface device 162, in various embodiments. For example, in one such embodiment, a PHY processor such as the PHY processor 130 or the PHY processor 170 is configured to implement at least a portion of the method 1100. According to another embodiment, a MAC processor such as the MAC processor 126 or the MAC processor 166 is also configured to implement a portion of the method 1100.

The method 1100 is a more specific embodiment of the method 1000 of FIG. 10. In some embodiments, the method 1100 is combined with one or more aspects of the method 1000 of FIG. 10.

At block 1104, a frequency bandwidth via which a PPDU will be transmitted in a vehicular communication network is selected. In an embodiment, the frequency bandwidth is selected from a set of permissible frequency bandwidths.

At block 1108, a set of permissible midamble periodicity values is selected from among a plurality of sets of permissible midamble periodicity values based on the frequency bandwidth selected at block 1104.

At block 1112, a midamble periodicity value is selected from the set of permissible midamble periodicity values selected at block 1108.

In an embodiment, the set of permissible frequency bandwidths includes a first frequency bandwidth and a second frequency bandwidth; the first frequency bandwidth corresponds to a first OFDM subcarrier spacing, and the second frequency bandwidth corresponds to a second OFDM subcarrier spacing that is different than the first OFDM subcarrier spacing; the plurality of sets of permissible midamble periodicity values includes a first set of permissible midamble periodicity values corresponding to the first OFDM subcarrier spacing and a second set of permissible midamble periodicity values corresponding to the second OFDM subcarrier spacing; and the first set of permissible midamble periodicity values is different than the second set of permissible midamble periodicity values.

In an embodiment, the second OFDM subcarrier spacing is 1/N of the first OFDM subcarrier spacing; N is a positive integer; and respective values in the second set of permissible midamble periodicity values are 1/N multiplied by respective values in the first set of permissible midamble periodicity values.

In an embodiment, the first frequency bandwidth is 20 MHz; the second frequency bandwidth is 10 MHz; and N is two.

In another embodiment, the first frequency bandwidth is 10 MHz; the second frequency bandwidth is 5 MHz; and N is two.

In an embodiment, the first OFDM subcarrier spacing is 78.125 kHz; and the second OFDM subcarrier spacing is 39.0625 kHz.

In another embodiment, the first OFDM subcarrier spacing is 156.25 kHz; and the second OFDM subcarrier spacing is 78.125 kHz.

In an embodiment, the set of permissible frequency bandwidths further includes a third frequency bandwidth; the third frequency bandwidth corresponds to a third OFDM subcarrier spacing that is different than the first OFDM subcarrier spacing and the second OFDM subcarrier spacing; the plurality of sets of permissible midamble periodicity values further includes a third set of permissible midamble periodicity values corresponding to the third OFDM subcarrier spacing; and the third set of permissible midamble periodicity values is different than the first set of permissible midamble periodicity values and the second set of permissible midamble periodicity values. In an embodiment, the first frequency bandwidth is 20 MHz; the second frequency bandwidth is 10 MHz; and the third frequency bandwidth is 5 MHz.

In an embodiment, the set of permissible frequency bandwidths includes a first frequency bandwidth, a second frequency bandwidth, and a third frequency bandwidth.

At block 1116, the PPDU is generated to include i) a PHY preamble and ii) a PHY data portion that includes one or more PHY midambles according to the selected midamble periodicity. Block 1116 includes generating the PHY preamble to include an indication of the selected midamble periodicity, and generating the PPDU to span the selected frequency bandwidth.

At block 1120, the PPDU is transmitted in the vehicular communication network.

In other embodiments, the method 1100 further includes selecting a downclocking ratio based on the bandwidth selected at block 1104; and block 1116 includes generating the PPDU i) according to the downclocking ratio, and ii) as a downclocked version of a PPDU format defined by one of a) the IEEE 802.11n Standard, b) the IEEE 802.11ac Standard, and c) the current draft of the IEEE 802.11ax Standard.

In other embodiments, the method 1100 further includes selecting a GI duration value from a set of at least four permissible GI duration values; and block 1116 includes: generating the PPDU according to the selected GI duration value, and generating the PHY preamble to include an indication of the selected GI duration value.

In an embodiment, block 1116 includes generating the PHY preamble to indicate the PHY midamble periodicity selected at block 1112. In an embodiment, generating the PHY preamble includes generating a signal field of the PHY preamble, and wherein the signal field is generated to indicate the PHY midamble periodicity selected at block 1112. In an embodiment, the signal field is a single contiguous field that is immediately adjacent to i) a training field in the PHY preamble, and ii) another training field in the PHY preamble or a PHY data portion of the PPDU; and the entire signal field is modulated on a single OFDM symbol.

Figure 12:
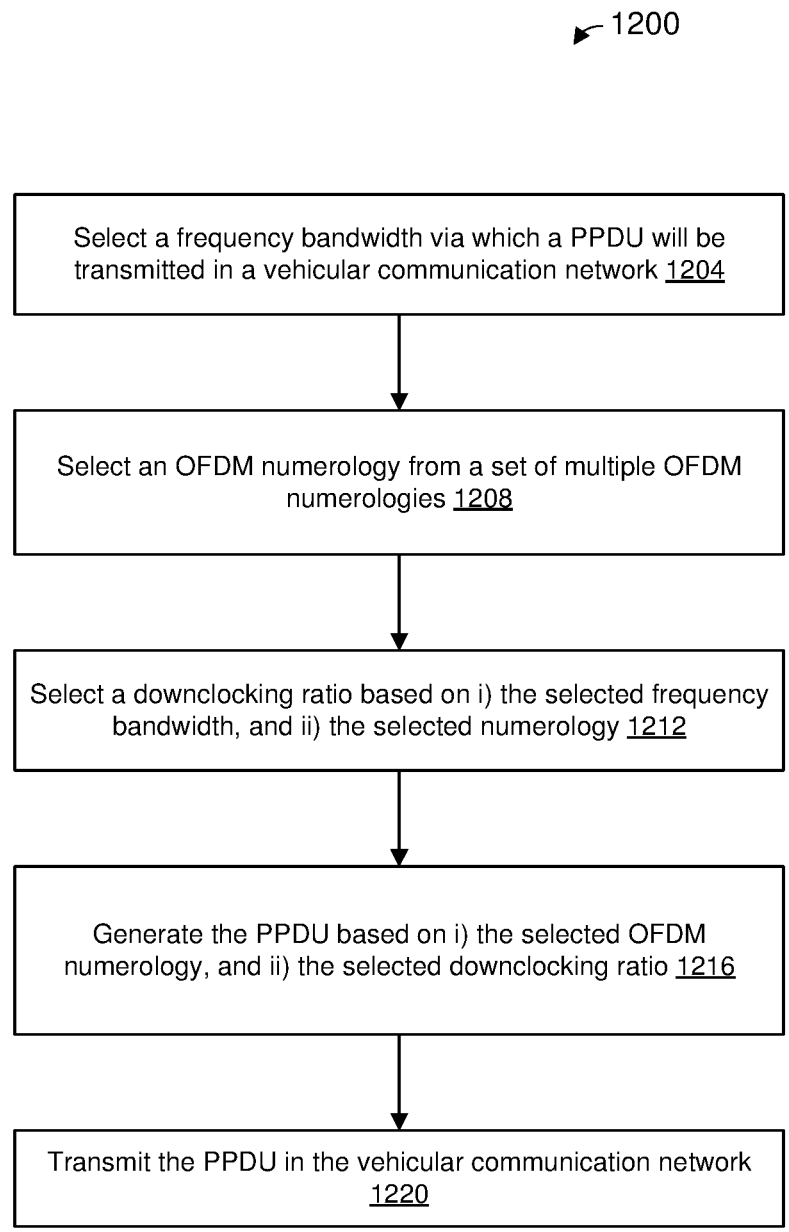
FIG. 12 is a flow diagram of another example method for generating and transmitting a PHY data unit, according to another embodiment.

FIG. 12 is a flow diagram of another example method 1200 for generating and transmitting a PPDU in a vehicular communication network, according to an embodiment. With reference to FIG. 1, the method 1200 is implemented by a network interface device such as the network interface device 122 or the network interface device 162, in various embodiments. For example, in one such embodiment, a PHY processor such as the PHY processor 130 or the PHY processor 170 is configured to implement at least a portion of the method 1200. According to another embodiment, a MAC processor such as the MAC processor 126 or the MAC processor 166 is also configured to implement a portion of the method 1200.

The method 1200 is a more specific embodiment of the method 1000 of FIG. 10. In some embodiments, the method 1200 is combined with one or more aspects of the method 1000 of FIG. 10. In some embodiments, the method 1200 is combined with one or more aspects of the method 1100 of FIG. 11.

At block 1204, a frequency bandwidth via which a PPDU will be transmitted in a vehicular communication network is selected. In an embodiment, the frequency bandwidth is selected from a set of permissible frequency bandwidths. In an embodiment, the set of permissible frequency bandwidths consists of three bandwidths: 20 MHz, 10 MHz, and 5 MHz. In another embodiment, the set of three permissible frequency bandwidths includes one or more bandwidths that are different than 20 MHz, 10 MHz, and 5 MHz. In another embodiment, the set of permissible frequency bandwidths includes at least three bandwidths, e.g., 20 MHz, 10 MHz, and 5 MHz, and/or one or more other suitable bandwidths. In another embodiment, the set of permissible frequency bandwidths consists of two bandwidths.

At block 1208, an OFDM numerology corresponding to a particular bandwidth is selected from a set of multiple OFDM numerologies corresponding to respective bandwidths. In an embodiment, the multiple OFDM numerologies in the set are defined by one or more of a) the IEEE 802.11n Standard, b) the IEEE 802.11ac Standard, and c) the IEEE 802.11ax Standard.

In some embodiments, block 1208 is omitted.

At block 1212, a downclocking ratio is selected based on the frequency bandwidth selected at block 1204 and the bandwidth corresponding to the OFDM numerology selected at block 1208. As merely an illustrative example, if the bandwidth selected at block 1204 is 10 MHz and the particular bandwidth corresponding to the selected numerology is 20 MHz, the downclocking ratio is selected as 1/2. As another merely illustrative example, if the bandwidth selected at block 1204 is 5 MHz and the particular bandwidth corresponding to the selected numerology is 20 MHz, the downclocking is selected as 1/4.

In embodiments that omit block 1208, the downclocking ratio is selected (at block 1212) based on the frequency bandwidth selected at block 1204.

At block 1216, the PPDU is generated i) based on the selected OFDM numerology and ii) according to the selected downclocking ratio. The PPDU is generated to span the selected frequency bandwidth. In embodiments that omit block 1208, the PPDU is generated i) based on a particular OFDM numerology and ii) according to the selected downclocking ratio. In an embodiment, the particular OFDM numerology is defined by one of a) the IEEE 802.11n Standard, b) the IEEE 802.11ac Standard, and c) the IEEE 802.11ax Standard. In an embodiment, the PPDU is generated as a downclocked version of a PPDU format defined by one of a) the IEEE 802.11n Standard, b) the IEEE 802.11ac Standard, and c) the IEEE 802.11ax Standard.

At block 1220, the PPDU is transmitted in the vehicular communication network.

Embodiment 1: A method for wireless communication, the method comprising: selecting, at a communication device, a frequency bandwidth via which a physical layer (PHY) protocol data unit (PPDU) will be transmitted in a vehicular communication network, wherein the frequency bandwidth is selected from a set of permissible frequency bandwidths; selecting, at a communication device, a downclocking ratio for generating the PPDU to span the selected frequency bandwidth, wherein the downclocking ratio is selected based on the selected frequency bandwidth; generating, at a communication device, the PPDU i) according to the selected downclocking ratio, and ii) based on an orthogonal frequency division multiplexing (OFDM) numerology defined by one of a) the IEEE 802.11n Standard, b) the IEEE 802.11ac Standard, and c) the IEEE 802.11ax Standard, wherein the PPDU is generated to span the selected frequency bandwidth; and transmitting, by the communication device, the PPDU in the vehicular communication network.

Embodiment 2: The method of embodiment 1, further comprising: selecting, at the communication device, the OFDM numerology from a set of multiple OFDM numerologies defined by one or more of a) the IEEE 802.11n Standard, b) the IEEE 802.11ac Standard, and c) the IEEE 802.11ax Standard.

Embodiment 3: The method of embodiment 2, wherein: the downclocking ratio is selected further based on the selected OFDM numerology.

Embodiment 4: The method of any of embodiments 1-3, wherein: the PPDU is generated as a downclocked version of a PPDU format defined by one of a) the IEEE 802.11n Standard, b) the IEEE 802.11ac Standard, and c) the IEEE 802.11ax Standard.

Embodiment 5: The method of any of embodiments 1-4, wherein: the frequency bandwidth is selected from a set consisting of 20 MHz, 10 MHz, and 5 MHz; and the downclocking ratio is selected from a set consisting of 1, 1/2, and 1/4.

Embodiment 6: The method of any of embodiments 1-5, further comprising: selecting, at the communication device, a set of permissible midamble periodicity values, from among a plurality of sets of permissible midamble periodicity values, based on the selected frequency bandwidth; and selecting, at the communication device, a midamble periodicity value from the selected set of permissible midamble periodicity values; wherein generating the PPDU comprises generating the PPDU to include i) a PHY preamble and ii) a PHY data portion that includes one or more PHY midambles according to the selected midamble periodicity, wherein the PHY preamble is generated to include an indication of the selected midamble periodicity.

Embodiment 7: The method of embodiment 6, wherein generating the PPDU includes generating the PHY preamble to include an indication of the selected midamble periodicity value.

Embodiment 8: The method of embodiment 7, wherein generating the PPDU includes generating the PHY preamble to further include an indication of the selected frequency bandwidth.

Embodiment 9: The method of embodiment 7, wherein: the indication of the selected midamble periodicity is included in a signal field of the PHY preamble; and the entire signal field is modulated onto a single OFDM symbol.

Embodiment 10: The method of any of embodiments 1-9, wherein: the downclocking ratio is selected from a set consisting of 1, 1/2, and 1/4; generating the PPDU according to the downclocking ratio 1 comprises generating the PPDU to have to a first orthogonal frequency division multiplexing (OFDM) subcarrier spacing; generating the PPDU according to the downclocking ratio 1/2 comprises generating the PPDU to have to a second OFDM subcarrier spacing that is one half of the first OFDM subcarrier spacing; and generating the PPDU according to the downclocking ratio 1/4 comprises generating the PPDU to have to a third OFDM subcarrier spacing that is one quarter of the first OFDM subcarrier spacing.

Embodiment 11: The method of embodiment 10, wherein: the first OFDM subcarrier spacing is 156.25 kHz; the second OFDM subcarrier spacing is 78.125 kHz; and the third OFDM subcarrier spacing is 39.0625 kHz.

Embodiment 12: The method of embodiment 10, wherein: the first OFDM subcarrier spacing is 312.5 kHz; the second OFDM subcarrier spacing is 156.25 kHz; and the third OFDM subcarrier spacing is 78.125 kHz.

Embodiment 13: The method of any of embodiments 1-12, further comprising: selecting, at the communication device, a guard interval (GI) duration value from a set of at least four permissible GI duration values; wherein generating the PPDU includes: generating the PPDU according to the selected GI duration value, and generating the PPDU to include a PHY preamble having an indication of the selected GI duration value.

Embodiment 14: An apparatus, comprising: a network interface device having one or more integrated circuit (IC) devices configured to: select a frequency bandwidth via which a physical layer (PHY) protocol data unit (PPDU) will be transmitted in a vehicular communication network, wherein the frequency bandwidth is selected from a set of permissible frequency bandwidths; select a downclocking ratio for generating the PPDU to span the selected frequency bandwidth, wherein the downclocking ratio is selected based on the selected frequency bandwidth; generate the PPDU i) according to the selected downclocking ratio, and ii) based on an orthogonal frequency division multiplexing (OFDM) numerology defined by one of a) the IEEE 802.11n Standard, b) the IEEE 802.11ac Standard, and c) the IEEE 802.11ax Standard, wherein the PPDU is generated to span the selected frequency bandwidth; and transmit the PPDU in the vehicular communication network.

Embodiment 15: The apparatus of embodiment 14, wherein the one or more IC devices are further configured to: select the OFDM numerology from a set of multiple OFDM numerologies defined by one or more of a) the IEEE 802.11n Standard, b) the IEEE 802.11ac Standard, and c) the IEEE 802.11ax Standard.

Embodiment 16: The apparatus of embodiment 15, wherein the one or more IC devices are further configured to: select the downclocking ratio further based on the selected OFDM numerology.

Embodiment 17: The apparatus of any of embodiments 14-16, wherein the one or more IC devices are further configured to: generate the PPDU as a downclocked version of a PPDU format defined by one of a) the IEEE 802.11n Standard, b) the IEEE 802.11ac Standard, and c) the IEEE 802.11ax Standard.

Embodiment 18: The apparatus of any of embodiments 14-17, wherein: the one or more IC devices are configured to select the frequency bandwidth from a set consisting of 20 MHz, 10 MHz, and 5 MHz; and the downclocking ratio is selected from a set consisting of 1, 1/2, and 1/4.

Embodiment 19: The apparatus of any of embodiments 14-18, wherein the one or more IC devices are further configured to: select a set of permissible midamble periodicity values, from among a plurality of sets of permissible midamble periodicity values, based on the selected frequency bandwidth; select a midamble periodicity value from the selected set of permissible midamble periodicity values; and generate the PPDU to include i) a PHY preamble and ii) a PHY data portion that includes one or more PHY midambles according to the selected midamble periodicity, wherein the PHY preamble is generated to include an indication of the selected midamble periodicity.

Embodiment 20: The apparatus of embodiment 19, wherein the one or more IC devices are further configured to generate the PHY preamble to include an indication of the selected midamble periodicity value.

Embodiment 21: The apparatus of embodiment 20, wherein the one or more IC devices are further configured to generate the PHY preamble to further include an indication of the selected frequency bandwidth.

Embodiment 22: The apparatus of embodiment 20, wherein the one or more IC devices are further configured to: include the indication of the selected midamble periodicity in a signal field of the PHY preamble; and modulate the entire signal field onto a single OFDM symbol.

Embodiment 23: The apparatus of any of embodiments 14-22, wherein: the downclocking ratio is selected from a set consisting of 1, 1/2, and 1/4; generating the PPDU according to the downclocking ratio 1 comprises generating the PPDU to have to a first orthogonal frequency division multiplexing (OFDM) subcarrier spacing; generating the PPDU according to the downclocking ratio 1/2 comprises generating the PPDU to have to a second OFDM subcarrier spacing that is one half of the first OFDM subcarrier spacing; and generating the PPDU according to the downclocking ratio 1/4 comprises generating the PPDU to have to a third OFDM subcarrier spacing that is one quarter of the first OFDM subcarrier spacing.

Embodiment 24: The apparatus of embodiment 23, wherein: the first OFDM subcarrier spacing is 156.25 kHz; the second OFDM subcarrier spacing is 78.125 kHz; and the third OFDM subcarrier spacing is 39.0625 kHz.

Embodiment 25: The apparatus of embodiment 23, wherein: the first OFDM subcarrier spacing is 312.5 kHz; the second OFDM subcarrier spacing is 156.25 kHz; the third OFDM subcarrier spacing is 78.125 kHz.

Embodiment 26: The apparatus of any of embodiments 14-25, wherein the one or more IC devices are further configured to: select a guard interval (GI) duration value from a set of at least four permissible GI duration values; generate the PPDU according to the selected GI duration value; and generate the PPDU to have a PHY preamble that includes an indication of the selected GI duration value.

Embodiment 27: A method for wireless communication, the method comprising: selecting, at a communication device, a downclocking ratio for generating a physical layer (PHY) protocol data unit (PPDU) to be transmitted in a vehicular communication network; generating, at a communication device, the PPDU i) according to the selected downclocking ratio, and ii) as a downclocked version of a PPDU format defined by one of a) the IEEE 802.11n Standard, b) the IEEE 802.11ac Standard, and c) the IEEE 802.11ax Standard; transmitting, by the communication device, the PPDU in the vehicular communication network.

Embodiment 28: The method of embodiment 27, further comprising: selecting, at the communication device, a frequency bandwidth via which the PPDU will be transmitted in the vehicular communication network, wherein the frequency bandwidth is selected from a set of permissible frequency bandwidths; wherein generating the PPDU comprises generating the PPDU to span the selected frequency bandwidth.

Embodiment 29: The method of embodiment 28, wherein: the downclocking ratio is selected based on the selected frequency bandwidth.

Embodiment 30: The method of embodiment 29, wherein: the frequency bandwidth is selected from a set consisting of 20 MHz, 10 MHz, and 5 MHz; the downclocking ratio is selected from a set consisting of 1, 1/2, and 1/4; the downclocking ratio 1 corresponds to the frequency bandwidth 20 MHz; the downclocking ratio 1/2 corresponds to the frequency bandwidth 10 MHz; and the downclocking ratio 1/4 corresponds to the frequency bandwidth 5 MHz.

Embodiment 31: The method of any of embodiments 28-30, further comprising: selecting, at the communication device, a set of permissible midamble periodicity values, from among a plurality of sets of permissible midamble periodicity values, based on the selected frequency bandwidth; and selecting, at the communication device, a midamble periodicity value from the selected set of permissible midamble periodicity values; wherein generating the PPDU comprises generating the PPDU to include i) a PHY preamble and ii) a PHY data portion that includes one or more PHY midambles according to the selected midamble periodicity, wherein the PHY preamble is generated to include an indication of the selected midamble periodicity.

Embodiment 32: The method of embodiment 31, wherein generating the PPDU includes generating the PHY preamble to include an indication of the selected midamble periodicity value.

Embodiment 33: The method of embodiment 31, wherein generating the PPDU includes generating the PHY preamble to further include an indication of the selected frequency bandwidth.

Embodiment 34: The method of embodiment 31, wherein: the indication of the selected midamble periodicity is included in a signal field of the PHY preamble; and the entire signal field is modulated onto a single OFDM symbol.

Embodiment 35: The method of any of embodiments 27-34, wherein: the downclocking ratio is selected from a set consisting of 1, 1/2, and 1/4; generating the PPDU according to the downclocking ratio 1 comprises generating the PPDU to have to a first orthogonal frequency division multiplexing (OFDM) subcarrier spacing; generating the PPDU according to the downclocking ratio 1/2 comprises generating the PPDU to have to a second OFDM subcarrier spacing that is one half of the first OFDM subcarrier spacing; and generating the PPDU according to the downclocking ratio 1/4 comprises generating the PPDU to have to a third OFDM subcarrier spacing that is one quarter of the first OFDM subcarrier spacing.

Embodiment 36: The method of embodiment 35, wherein: the first OFDM subcarrier spacing is 156.25 kHz; the second OFDM subcarrier spacing is 78.125 kHz; and the third OFDM subcarrier spacing is 39.0625 kHz.

Embodiment 37: The method of embodiment 35, wherein: the first OFDM subcarrier spacing is 312.5 kHz; the second OFDM subcarrier spacing is 156.25 kHz; and the third OFDM subcarrier spacing is 78.125 kHz.

Embodiment 38: The method of any of embodiments 27-37, further comprising: selecting, at the communication device, a guard interval (GI) duration value from a set of at least four permissible GI duration values; wherein generating the PPDU includes: generating the PPDU according to the selected GI duration value, and generating the PPDU to include a PHY preamble having an indication of the selected GI duration value.

Embodiment 39: An apparatus, comprising: a network interface device having one or more integrated circuit (IC) devices configured to: select a downclocking ratio for generating a physical layer (PHY) protocol data unit (PPDU) to be transmitted in a vehicular communication network, generate the PPDU i) according to the selected downclocking ratio, and ii) as a downclocked version of a PPDU format defined by one of a) the IEEE 802.11n Standard, b) the IEEE 802.11ac Standard, and c) the IEEE 802.11ax Standard, and transmit the PPDU in the vehicular communication network.

Embodiment 40: The apparatus of embodiment 39, wherein the one or more IC devices are further configured to: select a frequency bandwidth via which the PPDU will be transmitted in the vehicular communication network, wherein the frequency bandwidth is selected from a set of permissible frequency bandwidths; wherein generating the PPDU comprises generating the PPDU to span the selected frequency bandwidth.

Embodiment 41: The apparatus of embodiment 40, wherein the one or more IC devices are further configured to: select the downclocking ratio based on the selected frequency bandwidth.

Embodiment 42: The apparatus of embodiment 41, wherein: the one or more IC devices are configured to select the frequency bandwidth from a set consisting of 20 MHz, 10 MHz, and 5 MHz; the downclocking ratio is selected from a set consisting of 1, 1/2, and 1/4; the downclocking ratio 1 corresponds to the frequency bandwidth 20 MHz; the downclocking ratio 1/2 corresponds to the frequency bandwidth 10 MHz; and the downclocking ratio 1/4 corresponds to the frequency bandwidth 5 MHz.

Embodiment 43: The apparatus of any of embodiments 40-42, wherein the one or more IC devices are further configured to: select a set of permissible midamble periodicity values, from among a plurality of sets of permissible midamble periodicity values, based on the selected frequency bandwidth; select a midamble periodicity value from the selected set of permissible midamble periodicity values; and generate the PPDU to include i) a PHY preamble and ii) a PHY data portion that includes one or more PHY midambles according to the selected midamble periodicity, wherein the PHY preamble is generated to include an indication of the selected midamble periodicity.

Embodiment 44: The apparatus of embodiment 43, wherein the one or more IC devices are further configured to generate the PHY preamble to include an indication of the selected midamble periodicity value.

Embodiment 45: The apparatus of embodiment 44, wherein the one or more IC devices are further configured to generate the PHY preamble to further include an indication of the selected frequency bandwidth.

Embodiment 46: The apparatus of embodiment 44, wherein the one or more IC devices are further configured to: include the indication of the selected midamble periodicity in a signal field of the PHY preamble; and modulate the entire signal field onto a single OFDM symbol.

Embodiment 47: The apparatus of any of embodiments 39-46, wherein: the downclocking ratio is selected from a set consisting of 1, 1/2, and 1/4; generating the PPDU according to the downclocking ratio 1 comprises generating the PPDU to have to a first orthogonal frequency division multiplexing (OFDM) subcarrier spacing; generating the PPDU according to the downclocking ratio 1/2 comprises generating the PPDU to have to a second OFDM subcarrier spacing that is one half of the first OFDM subcarrier spacing; and generating the PPDU according to the downclocking ratio 1/4 comprises generating the PPDU to have to a third OFDM subcarrier spacing that is one quarter of the first OFDM subcarrier spacing.

Embodiment 48: The apparatus of embodiment 47, wherein: the first OFDM subcarrier spacing is 156.25 kHz; the second OFDM subcarrier spacing is 78.125 kHz; and the third OFDM subcarrier spacing is 39.0625 kHz.

Embodiment 49: The apparatus of embodiment 47, wherein: the first OFDM subcarrier spacing is 312.5 kHz; the second OFDM subcarrier spacing is 156.25 kHz; the third OFDM subcarrier spacing is 78.125 kHz.

Embodiment 60: The apparatus of any of embodiments 39-49, wherein the one or more IC devices are further configured to: select a guard interval (GI) duration value from a set of at least four permissible GI duration values; generate the PPDU according to the selected GI duration value; and generate the PPDU to have a PHY preamble that includes an indication of the selected GI duration value.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, one or more integrated circuits (ICs), an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for wireless communication in a vehicular communication network, the method comprising:
    selecting, at a communication device, a frequency bandwidth via which a physical layer (PHY) protocol data unit (PPDU) will be transmitted in the vehicular communication network, wherein the frequency bandwidth is selected from a set of permissible frequency bandwidths that includes a 10 MHz bandwidth and a 20 MHz bandwidth;
    generating, at a communication device, the PPDU i) according to a downclocking ratio of 1/2, and ii) based on an orthogonal frequency division multiplexing (OFDM) numerology defined by an IEEE 802.11ac Standard, wherein the PPDU is generated to span the selected frequency bandwidth and to include a PHY preamble having a legacy preamble portion and a non-legacy preamble portion, and wherein:
        in response to the selected frequency bandwidth being 10 MHz, the PPDU is generated according to the downclocking ratio of 1/2 and based on the OFDM numerology defined by the IEEE 802.11ac Standard for 20 MHz PPDUs, and
        in response to the selected frequency bandwidth being 20 MHz, the PPDU is generated according to the downclocking ratio of 1/2 and based on the OFDM numerology defined by the IEEE 802.11ac Standard for 40 MHz PPDUs; and
    transmitting, by the communication device, the PPDU in the vehicular communication network.

2. The method of claim 1, wherein generating the PPDU to include the PHY preamble having the legacy preamble portion and the non-legacy preamble portion comprises:
    generating, at the communication device, the legacy preamble portion to include a legacy signal field (L-SIG); and
    generating, at the communication device, the non-legacy preamble portion to include a non-legacy signal field.

3. The method of claim 1, wherein generating the PPDU to include the PHY preamble having the legacy preamble portion and the non-legacy preamble portion comprises:
    generating, at the communication device, the legacy preamble portion to include a legacy short training field (L-STF); and
    generating, at the communication device, the non-legacy preamble portion to include a non-legacy short training field.

4. The method of claim 3, wherein generating the PPDU to include the PHY preamble having the legacy preamble portion and the non-legacy preamble portion comprises:
    generating, at the communication device, the legacy preamble portion to include a legacy long training field (L-LTF); and
    generating, at the communication device, the non-legacy preamble portion to include one or more non-legacy long training fields.

5. The method of claim 1, wherein generating the PPDU includes generating the non-legacy preamble portion to include an indication of the selected frequency bandwidth.

6. The method of claim 1, further comprising:
    selecting, at the communication device, a midamble periodicity value from a set of multiple permissible midamble periodicity values;
    wherein generating the PPDU comprises generating the PPDU to include a PHY data portion that includes one or more PHY midambles according to the selected midamble periodicity value.

7. The method of claim 6, wherein generating the PPDU to include the PHY preamble having the legacy preamble portion and the non-legacy preamble portion comprises:
    generating, at the communication device, the legacy preamble portion to include a legacy signal field (L-SIG); and
    generating, at the communication device, the non-legacy preamble portion to include a non-legacy signal field that includes an indication of the selected midamble periodicity value.

8. The method of claim 1, wherein:
    generating the PPDU according to the downclocking ratio 1/2 comprises generating the PPDU to have to a second OFDM subcarrier spacing that is one half of a first OFDM subcarrier spacing of the IEEE 802.11ac Standard.

9. The method of claim 8, wherein:
    the first OFDM subcarrier spacing is 312.5 kHz; and
    the second OFDM subcarrier spacing is 156.25 kHz.

10. The method of claim 1, further comprising:
    selecting, at the communication device, a guard interval (GI) duration value from a set of multiple permissible GI duration values;
    wherein generating the PPDU to include the PHY preamble having the legacy preamble portion and the non-legacy preamble portion comprises:
        generating, at the communication device, the legacy preamble portion to include a legacy signal field (L-SIG), and
        generating, at the communication device, the non-legacy preamble portion to include a non-legacy signal field that includes an indication of the selected GI duration value; and
    wherein generating the PPDU includes generating the PPDU according to the selected GI duration value.

11. A wireless communication device, comprising:
    a wireless network interface device having one or more integrated circuit (IC) devices configured to:
        select a frequency bandwidth via which a physical layer (PHY) protocol data unit (PPDU) will be transmitted in the vehicular communication network, wherein the frequency bandwidth is selected from a set of permissible frequency bandwidths that includes a 10 MHz bandwidth and a 20 MHz bandwidth, and generate the PPDU i) according to a downclocking ratio of 1/2, and ii) based on an orthogonal frequency division multiplexing (OFDM) numerology defined by an IEEE 802.11ac Standard, wherein the PPDU is generated to span the selected frequency bandwidth and to include a PHY preamble having a legacy preamble portion and a non-legacy preamble portion, and wherein:

in response to the selected frequency bandwidth being 10 MHz, the PPDU is generated according to the downclocking ratio of 1/2 and based on the OFDM numerology defined by the IEEE 802.11ac Standard for 20 MHz PPDUs, and in response to the selected frequency bandwidth being 20 MHz, the PPDU is generated according to the downclocking ratio of 1/2 and based on the OFDM numerology defined by the IEEE 802.11ac Standard for 40 MHz PPDUs;

wherein the one or more IC devices are further configured to control the wireless network interface device to transmit the PPDU in the vehicular communication network.

12. The wireless communication device of claim 11, wherein the one or more IC devices are further configured to:

generate the legacy preamble portion to include a legacy signal field (L-SIG); and generate the non-legacy preamble portion to include a non-legacy signal field.

13. The wireless communication device of claim 11, wherein the one or more IC devices are further configured to:

generate the legacy preamble portion to include a legacy short training field (L-STF); and generate the non-legacy preamble portion to include a non-legacy short training field.

14. The wireless communication device of claim 13, wherein the one or more IC devices are further configured to:

generate the legacy preamble portion to include a legacy long training field (L-LTF); and generate the non-legacy preamble portion to include one or more non-legacy long training fields.

15. The wireless communication device of claim 11, wherein the one or more IC devices are further configured to generate the non-legacy preamble portion to include an indication of the selected frequency bandwidth.

16. The wireless communication device of claim 11, wherein the one or more IC devices are further configured to:

select a midamble periodicity value from a set of multiple permissible midamble periodicity values; and generate the PPDU to include a PHY data portion that includes one or more PHY midambles according to the selected midamble periodicity value.

17. The wireless communication device of claim 16, wherein the one or more IC devices are further configured to:

generating, at the communication device, the legacy preamble portion to include a legacy signal field (L-SIG); and generating, at the communication device, the non-legacy preamble portion to include a non-legacy signal field that includes an indication of the selected midamble periodicity value.

18. The wireless communication device of claim 11, wherein the one or more IC devices are further configured to:

generate the PPDU to have to a second OFDM subcarrier spacing that is one half of a first OFDM subcarrier spacing of the IEEE 802.11ac Standard.

19. The wireless communication device of claim 18, wherein:

the first OFDM subcarrier spacing is 312.5 kHz; and the second OFDM subcarrier spacing is 156.25 kHz.

20. The wireless communication device of claim 11, wherein the one or more IC devices are further configured to:

select a guard interval (GI) duration value from a set of multiple permissible GI duration values;

generate the legacy preamble portion to include a legacy signal field (L-SIG);

generate the non-legacy preamble portion to include a non-legacy signal field that includes an indication of the selected GI duration value; and generate the PPDU according to the selected GI duration value.

21. The wireless communication device of claim 11, wherein:

the wireless network interface device comprises one or more wireless transceivers implemented at least partially on the one or more IC devices; and the one or more wireless transceivers are configured to transmit the PPDU.

22. The wireless communication device of claim 21, further comprising:

one or more antennas coupled to the one or more wireless transceivers.

* * * * *